United States Patent
Xing et al.

(10) Patent No.: US 11,133,909 B2
(45) Date of Patent: Sep. 28, 2021

(54) SCHEDULING HARQ TRANSMISSIONS IN MINI-SLOTS BASED ON FADING CONDITIONS

(71) Applicant: T-Mobile USA, Inc., Bellevue, WA (US)

(72) Inventors: Shuqing Xing, Bellevue, WA (US); Wafik Abdel Shahid, Kenmore, WA (US); Scott Francis Migaldi, Cary, IL (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/206,909

(22) Filed: Nov. 30, 2018

(65) Prior Publication Data

US 2020/0177347 A1     Jun. 4, 2020

(51) Int. Cl.
    *H04L 1/18*        (2006.01)
    *H04L 5/00*        (2006.01)
               (Continued)

(52) U.S. Cl.
    CPC .......... *H04L 5/0055* (2013.01); *H04L 1/1819* (2013.01); *H04W 28/04* (2013.01);
               (Continued)

(58) Field of Classification Search
    CPC .... H04L 5/0055; H04L 1/1819; H04W 28/04; H04W 72/085; H04W 72/1273; H04W 72/0446
See application file for complete search history.

(56) References Cited

U.S. PATENT DOCUMENTS

2003/0091103 A1*   5/2003   Sendonaris ........... H04W 52/24
                                                      375/148
2005/0190849 A1*   9/2005   McNamara .......... H04B 7/0691
                                                      375/267
(Continued)

FOREIGN PATENT DOCUMENTS

WO     WO2013056394 A1     4/2013
WO     WO2018085007 A1     5/2018
(Continued)

OTHER PUBLICATIONS

Hybrid ARQ Transmission and Combining for MIMO Systems—IEEE International Conference on Communications, Date of Conference: May 11-15, 2003, Conference Location: Anchorage, AK, USA, Print ISBN: 0-7803-7802-4 (Year: 2003).*

(Continued)

*Primary Examiner* — Edan Orgad
*Assistant Examiner* — Malick A Sohrab
(74) *Attorney, Agent, or Firm* — Lee & Hayes, P.C.

(57) ABSTRACT

Systems, methods, and devices can be utilized to schedule at least one Hybrid Automatic Repeat Request (HARQ) transmission and at least one HARQ feedback message in the same Physical Resource Block (PRB). A HARQ transmission can be scheduled in a mini-slot of the PRB. Accordingly, latencies associated with transmitting and receiving the PRB can be reduced, while the high reliability of HARQ can be retained. Implementations can be applied to 5G technologies such as Ultra Reliable Low Latency Communications (URLLCs) and enhanced Mobile BroadBand (eMBB), as well as other low-latency communications. A method can include detecting a fading condition of a device; scheduling, in one or more mini-slots of a PRB, a HARQ transmission based at least in part on the fading condition;

(Continued)

and transmitting, to the device, the HARQ transmission in the one or more mini-slots of the PRB.

20 Claims, 23 Drawing Sheets

(51) Int. Cl.
*H04W 28/04* (2009.01)
*H04W 72/08* (2009.01)
*H04W 72/12* (2009.01)
*H04W 72/04* (2009.01)

(52) U.S. Cl.
CPC ..... *H04W 72/0446* (2013.01); *H04W 72/085* (2013.01); *H04W 72/1273* (2013.01)

(56) References Cited

U.S. PATENT DOCUMENTS

| | | | |
|---|---|---|---|
| 2007/0243874 A1 | 10/2007 | Park et al. | |
| 2009/0013232 A1* | 1/2009 | Wan | H04L 1/1816 714/748 |
| 2011/0283157 A1 | 11/2011 | Yang et al. | |
| 2014/0050182 A1 | 2/2014 | Iwai et al. | |
| 2014/0233457 A1 | 8/2014 | Koutsimanis et al. | |
| 2015/0139000 A1* | 5/2015 | Matin | H04W 28/0236 370/252 |
| 2018/0063865 A1 | 3/2018 | Islam et al. | |
| 2018/0132237 A1 | 5/2018 | Sundararajan et al. | |
| 2018/0206211 A1 | 7/2018 | Seo et al. | |
| 2018/0279344 A1* | 9/2018 | Bagheri | H04W 72/0446 |
| 2018/0310333 A1* | 10/2018 | Akkarakaran | H04W 72/14 |
| 2018/0324786 A1 | 11/2018 | Hooli et al. | |
| 2018/0359745 A1* | 12/2018 | Yeo | H04L 1/18 |
| 2018/0368169 A1 | 12/2018 | Jung et al. | |
| 2019/0013908 A1* | 1/2019 | Xiong | H04W 72/0413 |
| 2019/0158251 A1* | 5/2019 | Park | H04L 5/0055 |
| 2019/0159194 A1* | 5/2019 | Huang | H04L 5/0057 |
| 2019/0245656 A1* | 8/2019 | Baghel | H04L 1/189 |
| 2020/0007298 A1* | 1/2020 | Korhonen | H04L 1/1861 |
| 2020/0059871 A1* | 2/2020 | Ryu | H04W 76/27 |
| 2020/0077432 A1* | 3/2020 | Xiong | H04L 1/1812 |
| 2020/0177317 A1 | 6/2020 | Xing et al. | |
| 2020/0177346 A1 | 6/2020 | Xing et al. | |
| 2020/0196343 A1* | 6/2020 | Marinier | H04L 1/1854 |

FOREIGN PATENT DOCUMENTS

| | | |
|---|---|---|
| WO | WO2018127370 A1 | 7/2018 |
| WO | WO2018128474 A1 | 7/2018 |
| WO | WO2018128756 A1 | 7/2018 |

OTHER PUBLICATIONS

CATT, "Short duration PUCCH structure", R1-1704577, 3GPP TSG RAN WG1 Meeting #88bis, Spokane, WA, USA, Mar. 25, 2017, section 3, 7 pages.
MediaTek Inc., "Frame Structure for NR-U Operation", R1-1812353, 3GPP TSG RAN WG1 Meeting #95, Spokane, WA, Nov. 2018, 12 pages.
Nokia et al, "On Configured Grant Enhancements for NR URLLC", R1-1810662, 3GPP TSG RAN WG1 Meeting #94bis, Chengdu, China, Oct. 2018, 12 pages.
Office Action for U.S. Appl. No. 16/206,648, dated Mar. 20, 2020, Xing, "Selecting Mini-Slots According to Conditions", 15 pages.
The PCT Search Report and Written Opinion dated Apr. 7, 2020, for PCT Application No. PCT/US2019/060428, 12 pages.
The PCT Search Report and Written Opinion dated Mar. 12, 2020, for PCT Application No. PCT/US2019/062015, 9 pages.
Office Action for U.S. Appl. No. 16/206,822, dated Dec. 28, 2020, Xing, "Scheduling HARQ Transmissions in Mini-Slots", 28 pages.
Office Action for U.S. Appl. No. 16/206,822, dated Aug. 6, 2020, Xing, "Scheduling HARQ Transmissions in Mini-Slots", 23 pages.

* cited by examiner

SCHEDULING HARQ TRANSMISSIONS IN MINI-SLOTS BASED ON FADING CONDITIONS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures.

DETAILED DESCRIPTION

Figure 1:
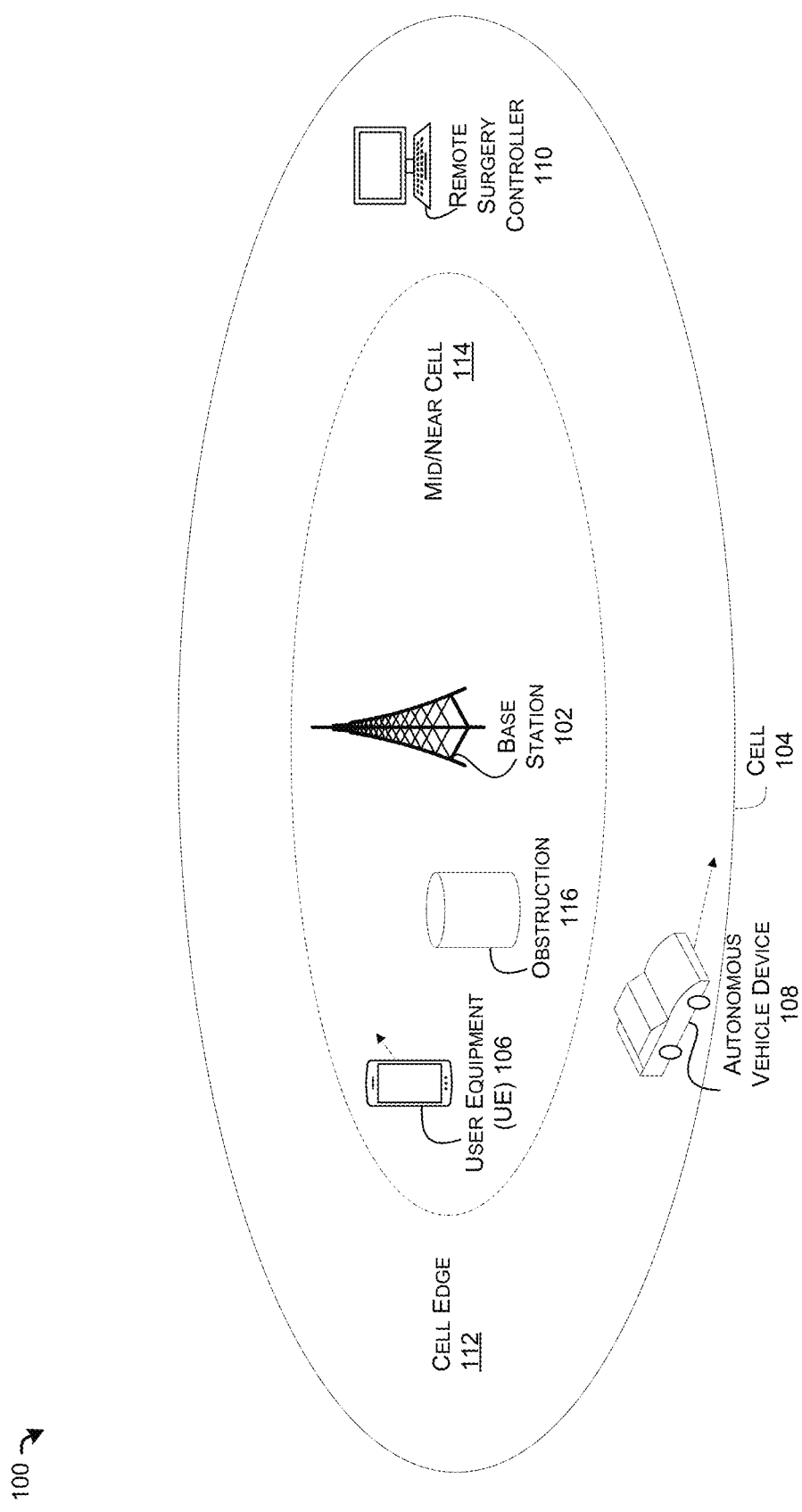
FIG. 1 illustrates an example network environment according to various embodiments.

The systems, devices, and techniques described herein relate to selecting, scheduling, transmitting, and receiving Hybrid Automatic Repeat reQuest (HARQ) information in mini-slots.

Certain new types of communications require substantial reliability and low latency. For example, communications used to control autonomous vehicles, remote surgery devices, factory automation devices, and the like, should be communicated quickly and substantially error-free.

Some types of communications, such as Ultra Reliable Low Latency Communications (URLLCs), are specified with particular goals of high reliability and low latency. For example, URLLCs can be defined as having a reliability of less than one packet failure per 10,000 data packets, and a latency of less than one millisecond, wherein a packet failure can be defined, in some cases, as a missing packet or a packet with a latency of greater than one millisecond. Other types of communications, such as enhanced Mobile Broadband (eMBB) communications are also characterized by low latency.

In order to achieve the reliability requirements of URLLCs and other types of ultra-reliable communications, HARQ techniques can be used. In an example HARQ process, various error-detection and error-correction information, along with data, are transmitted from a source to a destination. If the destination determines that the information and the data include correctable errors, if any, the destination transmits a positive acknowledgement or an acknowledgement (ACK) to the source. However, if the destination determines that the information and the data include uncorrectable errors, the destination transmits a negative acknowledgement or a non-acknowledgement (NACK) to the source. In response, the source can retransmit the information and the data to the destination. Thus, in addition to the data being transmitted, a HARQ process can include transmitting error-detection and error correction information, feedback messages, and retransmissions over communications resources.

Although HARQ techniques can enhance reliability, HARQ techniques can also increase latency because they may require transmitting (and retransmitting) a significant amount of additional information compared to non-HARQ methods. Latency can be further exacerbated by other delays, such as a scheduling delay, a queuing delay, a transmission delay, receiving-side processing, and a decoding delay. Accordingly, there is a need to reduce the latency of communications that utilize HARQ, or that utilize other error detection and error correction techniques, in order to achieve the strict latency requirements of URLLCs and/or of other types of low-latency communications.

According to various embodiments of the present disclosure, HARQ transmissions (and, in some cases, HARQ retransmissions) are scheduled in mini-slots. A mini-slot may be defined as one or more adjacent symbols in a slot, wherein the mini-slot does not include every symbol in the slot. By scheduling a HARQ transmission in a mini-slot of a slot in a Physical Resource Block (PRB) or a frame, a feedback message (e.g., an ACK or a NACK) corresponding to the HARQ transmission can also be scheduled in the PRB or frame. Accordingly, slots can be scheduled to include HARQ transmissions and self-contained acknowledgements. Embodiments can be used to reduce L1/L2 latency and enhance reliability.

In some embodiments, a number of symbols used to support a HARQ transmission, or another type of HARQ message, can depend according to various conditions. In certain instances, a number of bits in each symbol can vary according to certain conditions. In some examples, a number of symbols used to transmit data with the HARQ transmission can change according to the type of services associated with the data. According to various implementations of the present disclosure, a mini-slot size can be selected based on whether certain conditions (e.g., a type of service being requested is a certain type of service, radio frequency conditions are above or below a certain threshold, a device is located in a mid-cell region or a cell-edge region, etc.) are satisfied.

Various embodiments of the present disclosure are directed to solving a specific problem in the technological field of computer networks. By scheduling HARQ transmissions and/or HARQ feedback messages in a the same PRB, previously unachievable low latency levels can be attained, while the high reliability of HARQ-based communication can be maintained. In some embodiments, at least one HARQ transmission and at least one HARQ feedback message are scheduled in mini-slots of the same self-contained slot. Certain implementations of the present disclosure improve the field of wireless communication by reducing latency.

In addition, various embodiments of the present disclosure can improve the technological field of wireless communication by more efficiently utilizing wireless resources, thereby improving overall throughput.

FIG. 1 illustrates an example network environment 100 according to various embodiments. In the network environment 100, a base station 102 can communicate with any of a variety of devices in a cell 104, such as a user equipment (UE) 106, an autonomous vehicle device 108, and a remote surgery controller 110.

In various embodiments, the base station 102 may include device(s) configured to schedule wireless resources for uplink and downlink communications within the cell 104. The base station 102 may further include device(s) configured to transmit communications over the wireless resources to devices located in the cell 104 (e.g., the UE 106, the autonomous vehicle device 108, and the remote surgery controller 110), and receive communications over the wireless resources from the devices located in the cell 104.

Although not illustrated in FIG. 1, in some instances, the base station 102 may relay communications between an external network (e.g., a core network) and the devices located in the cell 104. A core network, for example, can provide services to device(s) via the base station 102 from a wide area network (WAN), such as the Internet. In some instances, the core network includes an IP Multimedia Subsystem (IMS) core (sometimes referred to as an "IMS core network," an "IMS network," a "Core Network (CN)," or an "IM CN Subsystem"). IMS is an architectural framework defined by 3GPP for delivering Internet Protocol (IP) multimedia to a device, such as a UE. The IMS core can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS core using his/her device. A user can also utilize an associated device to receive, provide, or otherwise interact with various different IMS-based services by accessing the IMS core. It is to be appreciated that any number of base stations, such as base station 102, and/or IMS nodes can be associated with the IMS network.

An operator of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device is configured to request establishment of a communication session. In the case of telephony services, the communication session can comprise a call (e.g., a voice-based communication session, such as a Voice Over LTE (VoLTE) call, or a Wi-Fi call).

In some instances, the base station 102 can utilize wireless resources specified in the 5G New Radio (NR) standard, as defined by 3GPP. In certain implementations, the base station 102 can transmit and receive communications over frequency resources including "millimeter wave" bands including, but not limited to 26 GHz, 28 GHz, 39 GHz, 60 GHz, and the like. In some embodiments, the base station 102 can be, or at least include a gNodeB.

In addition, the base station 102 may utilize other types of wireless resources. For example, the base station 102 may utilize a wireless band including frequency resources in at least one of a Citizens Broadband Radio Service (CBRS) band (e.g., a 3550-3700 MHz band), a Long Term Evolution (LTE) Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the base station may utilize the frequency resources discussed herein in the context of any 5G embodiments.

In some embodiments, the base station 102 is part of a Non-Standalone (NSA) architecture and/or a Standalone (SA) architecture. In an NSA architecture, the base station 102 may be coordinate with an LTE base station, and/or may relay services between devices in the cell 104 and an LTE core network (e.g., an Evolved Packet Core (EPC)). In an SA architecture, the base station 102 may relay services between devices in the cell 104 and a 5G core network.

The cell 104 may be a geographic region in which the base station 102 can transmit and/or receive wireless communications. The cell 104 may be divided into at least two regions, which are defined according to a distance from the base station 102, a quality of wireless communications with the base station 102, sources of attenuation in the cell 104, etc. For example, the cell 104 may include a mid- or near-cell region 114 and a cell edge region 112. In some instances, the mid-cell region 114 is less than a threshold distance from the base station 102 and is a region where wireless communication with the base station 102 is relatively strong. In certain instances, the cell edge region 112 is more than a threshold distance from the base station 102 and has an outer boundary that is defined by an outer boundary of the cell 104. In some instances, the cell edge region 112 is a region where wireless communication with the base station 102 is weaker than in the mid-cell region 114.

One or more devices configured to transmit and/or receive wireless communications with the base station 102 may be located in the cell 104. Any of the devices may be capable of supporting NR communications. For example, the devices may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

The devices may be any form of devices capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of devices can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

As illustrated in FIG. 1, the UE 106, the autonomous vehicle device 108, and the remote surgery controller 110 are examples of devices located in the cell 104.

The UE 106 may be defined as a mobile device configured to transmit and receive communications with the base station 102 over the wireless resources. As illustrated in FIG. 1, the UE 106 is located in the mid-cell region 114, however, the UE 106 may move into the cell edge region 112, and/or outside of the cell 104 entirely. In some embodiments, the UE 106 may move in the cell 104 while transmitting and receiving communications with the base station 102. The UE 106 may move relatively slowly behind an obstruction 116, and may therefore experience a slow-fading condition.

In various implementations, the term "fading" can refer to a variation of a frequency, an amplitude, and/or phase of a wireless signal. Fading may be a consequence of attenuation. A signal may fade with respect to time, geographical position, radio frequency, or a combination thereof. In some instances, a device experiences a fading condition when it transmits and/or receives a wireless signal exhibiting a Doppler shift.

A device may experience a slow-fading condition when the device transmits or receives a signal with a relatively slowly changing amplitude and/or phase. In some instances, a signal exhibits a slow-fading condition when a coherence time (e.g., a time interval over which a phase of the signal is predictable, on average) of the signal is greater than a period of a symbol in the signal. A device that is moving relatively slowly through a cell region, e.g., cell region 114, may experience slow fading. A device that is separated from a source of the wireless signal, e.g., the base station 102, by an obstruction, e.g., the obstruction 116, a hill, or a building, may experience slow fading. In some embodiments, a device is experiencing a slow-fading condition when the device transmits and/or receives a wireless signal exhibiting a Doppler shift that is greater than a first threshold, but less than a second threshold.

A device may experience a fast-fading condition when the device transmits or receives a signal with a relatively fast changing amplitude and/or phase. In some instances, a signal exhibits a fast-fading condition when a coherence time of the signal is less than a period of a symbol in the signal. A device that is moving relatively quickly through a cell region, e.g., cell 104, may experience a fast-fading condition. In some embodiments, a device is experiencing a fast-fading condition when the device transmits and/or receives a wireless signal exhibiting a Doppler shift that is greater than the first threshold and greater than the second threshold.

The autonomous vehicle device 108 may be a mobile device configured to transmit and receive communications with the base station 102 over the wireless resources, and to control a self-driving car according to the communications with the base station 102. These communications may be relayed to the autonomous vehicle device 108 by the base station 102 from a remote controller device (e.g., one or more servers). In some embodiments, the autonomous vehicle device 108 may be further configured to receive sensor information from the self-driving car and to transmit the sensor information to the remote controller device via communications with the base station 102. In certain cases, the autonomous vehicle device 108 can control the self-driving car based on instructions from the remote controller device and can deliver the sensor information to the remote controller device, substantially in real-time. In some instances, the autonomous vehicle device 108 may request, transmit, and/or receive URLLCs with the base station 102. As illustrated in FIG. 1, the autonomous vehicle device 108 may be located in the cell edge region 112, however, the autonomous vehicle device 108 may move into the mid-cell region 114, and/or outside of the cell 104 entirely. In some embodiments, the autonomous vehicle device 108 is attached to a moving vehicle, such as the self-driving car. The autonomous vehicle device 108 may move relatively quickly behind the obstruction 116 while communicating with the base station 102 and may therefore experience a fast-fading condition. In particular implementations, the autonomous vehicle device 108 communicates with other devices via communications with the base station 102 with an end-to-end latency of less than 5 milliseconds and a reliability of at least 99.999%.

The remote surgery controller 110 may be a mobile or stationary device configured to transmit and receive communications with the base station 102 over the wireless resources, and to control a surgical device according to the communications with the base station 102. In some embodiments, the remote surgery controller 110 may be configured to control a surgical robot according to directions from a remote device via communications received from the base station 102. The remote surgery controller 110 may be further configured to gather sensor information (e.g. haptic feedback information) from the surgical robot and transmit the sensor information to the remote device via the base station 102. In some cases, the remote surgery controller 110 executes the directions from the remote device and provides the sensor information to the remote device without substantial lag time. In various instances, the remote surgery controller 110 may request, transmit, and/or receive URLLCs with the base station 102. As illustrated in FIG. 1, the remote surgery controller 110 may be located in the cell edge region 112, however, the remote surgery controller 110 may be located in the mid-cell region, or may be located entirely outside of the cell 104. In particular implementations, the remote surgery controller 110 communicates with other devices via communications with the base station 102 with an end-to-end latency of less than 1 millisecond and a reliability of at least 99.9999%.

Although not illustrated, the devices in the cell 104 may further include an industrial automation controller. The industrial automation controller may be a mobile or stationary device configured to transmit and receive communications with the base station 102 over wireless resources, and to control factory equipment according to the communications with the base station 102. In some instances, the industrial automation controller is configured to gather sensor data from factory equipment and transmit the sensor data to another device via the base station 102. In particular implementations, the industrial automation controller communicates with other devices via communications with the base station 102 with an end-to-end latency of less than 0.5 milliseconds and a reliability of at least 99.9999%.

As may be understood, the network 100 may be implemented in accordance with any one of Option 3, 3a, 3x, 4, 4a, 7, 7a, and/or 7x, as defined by 3GPP. That is, the network 100 may include a 5G core and/or may include additional data-plane or control-plane signaling. In general, the techniques discussed herein may be implemented in any dual connectivity or multi connectivity environment.

Figure 2:
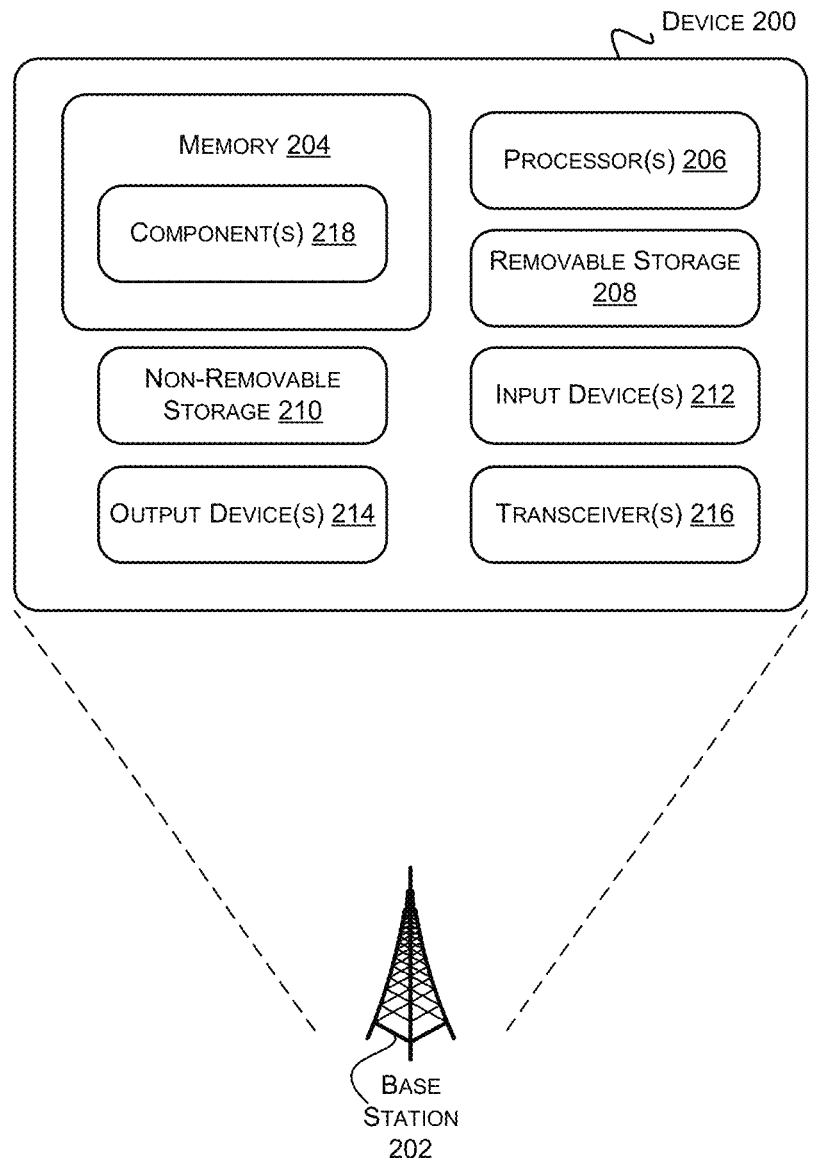
FIG. 2 illustrates an example of a base station according to various embodiments.

FIG. 2 illustrates an example of a base station 202, such as the base station 102 illustrated in FIG. 1. The base station 202 may include a device 200 that includes any of memory 204, processor(s) 206, removable storage 208, non-removable storage 210, input device(s) 212, output device(s) 214, and transceiver(s) 216. The device 200 may be configured to perform various methods and functions disclosed herein.

The memory 204 may include component(s) 218. The component(s) 218 may include at least one of instruction(s), program(s), database(s), software, operating system(s), etc. In some implementations, the component(s) 218 include instructions that are executed by processor(s) 206 and/or other components of the device 200.

In some embodiments, the processor(s) 206 include a central processing unit (CPU), a graphics processing unit (GPU), or both CPU and GPU, or other processing unit or component known in the art.

The device 200 may also include additional data storage devices (removable and/or non-removable) such as, for example, magnetic disks, optical disks, or tape. Such additional storage is illustrated in FIG. 2 by removable storage 208 and non-removable storage 210. Tangible computer-readable media can include volatile and non-volatile, removable and non-removable media implemented in any method or technology for storage of information, such as computer readable instructions, data structures, program modules, or other data. The memory 204, the removable storage 208, and the non-removable storage 210 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 200. Any such tangible computer-readable media can be part of the device 200.

The device 200 may be configured to communicate over a telecommunications network using any common wireless and/or wired network access technology. Moreover, the device 200 may be configured to run any compatible device Operating System (OS).

The device 200 also can include input device(s) 212, such as a keypad, a cursor control, a touch-sensitive display, voice input device, etc., and output device(s) 214 such as a display, speakers, printers, etc. These devices are well known in the art and need not be discussed at length here.

As illustrated in FIG. 2, the device 200 also includes one or more wired or wireless transceiver(s) 216. For example, the transceiver(s) 216 can include a network interface card (NIC), a network adapter, a Local Area Network (LAN) adapter, or a physical, virtual, or logical address to connect to various network components, for example. To increase throughput when exchanging wireless data, the transceiver(s) 216 can utilize multiple-input/multiple-output (MIMO) technology. The transceiver(s) 216 can comprise any sort of wireless transceivers capable of engaging in wireless, radio frequency (RF) communication. The transceiver(s) 216 can also include other wireless modems, such as a modem for engaging in Wi-Fi, WiMAX, Bluetooth, infrared communication, and the like. The transceiver(s) 216 may include transmitter(s), receiver(s), or both.

Figure 3:
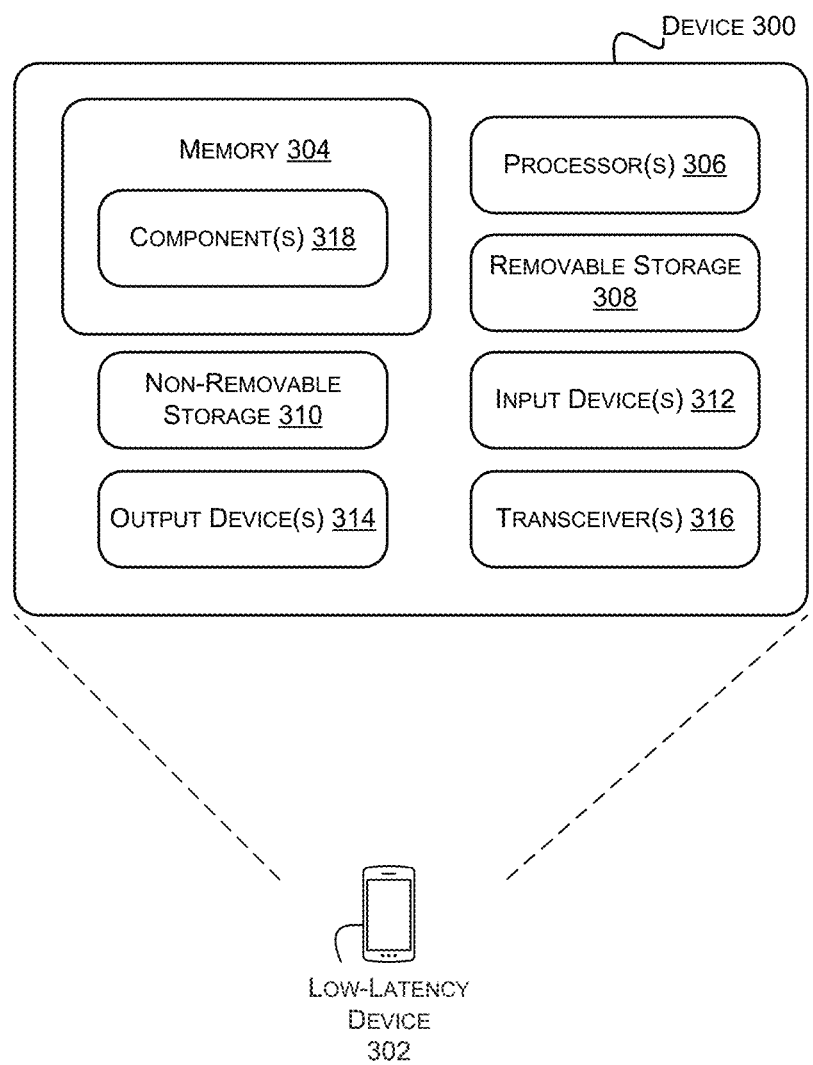
FIG. 3 illustrates an example of a device according to various embodiments.

FIG. 3 illustrates an example of a device 300. The device 300 may be part of low-latency device 302, such as any of the UE 106, the autonomous vehicle device 108, and the remote surgery controller 110 illustrated in FIG. 1. The device 300 includes any of memory 304, processor(s) 306, removable storage 308, non-removable storage 310, input device(s) 312, output device(s) 314, and transceiver(s) 316. The device 300 may be configured to perform various methods and functions disclosed herein.

The memory 304 may include component(s) 318. The component(s) 318 may include at least one of instruction(s), program(s), database(s), software, operating system(s), etc. In some implementations, the component(s) 318 include instructions that are executed by processor(s) 306 and/or other components of the device 300.

In some embodiments, the processor(s) 306 include a central processing unit (CPU), a graphics processing unit (GPU), or both CPU and GPU, or other processing unit or component known in the art.

The device 300 may also include additional data storage devices (removable and/or non-removable) such as, for example, magnetic disks, optical disks, or tape. Such additional storage is illustrated in FIG. 3 by removable storage 308 and non-removable storage 310. Tangible computer-readable media can include volatile and non-volatile, removable and non-removable media implemented in any method or technology for storage of information, such as computer readable instructions, data structures, program modules, or other data. The memory 304, the removable storage 308, and the non-removable storage 310 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 300. Any such tangible computer-readable media can be part of the device 300.

The device 300 may be configured to communicate over a telecommunications network using any common wireless and/or wired network access technology. Moreover, the device 300 may be configured to run any compatible device Operating System (OS), including but not limited to, Microsoft Windows Mobile, Google Android, Apple iOS, Linux Mobile, as well as any other common mobile device OS.

The device 300 also can include input device(s) 312, such as a keypad, a cursor control, a touch-sensitive display, voice input device, etc., and output device(s) 314 such as a display, speakers, printers, etc. These devices are well known in the art and need not be discussed at length here.

As illustrated in FIG. 3, the device 300 also includes one or more wired or wireless transceiver(s) 316. For example, the transceiver(s) 316 can include a network interface card (NIC), a network adapter, a Local Area Network (LAN) adapter, or a physical, virtual, or logical address to connect to various network components, for example. To increase throughput when exchanging wireless data, the transceiver(s) 316 can utilize multiple-input/multiple-output (MIMO) technology. The transceiver(s) 316 can comprise any sort of wireless transceivers capable of engaging in wireless, radio frequency (RF) communication. The transceiver(s) 316 can also include other wireless modems, such as a modem for engaging in Wi-Fi, WiMAX, Bluetooth, infrared communication, and the like. The transceiver(s) 316 may include transmitter(s), receiver(s), or both.

Figure 4:
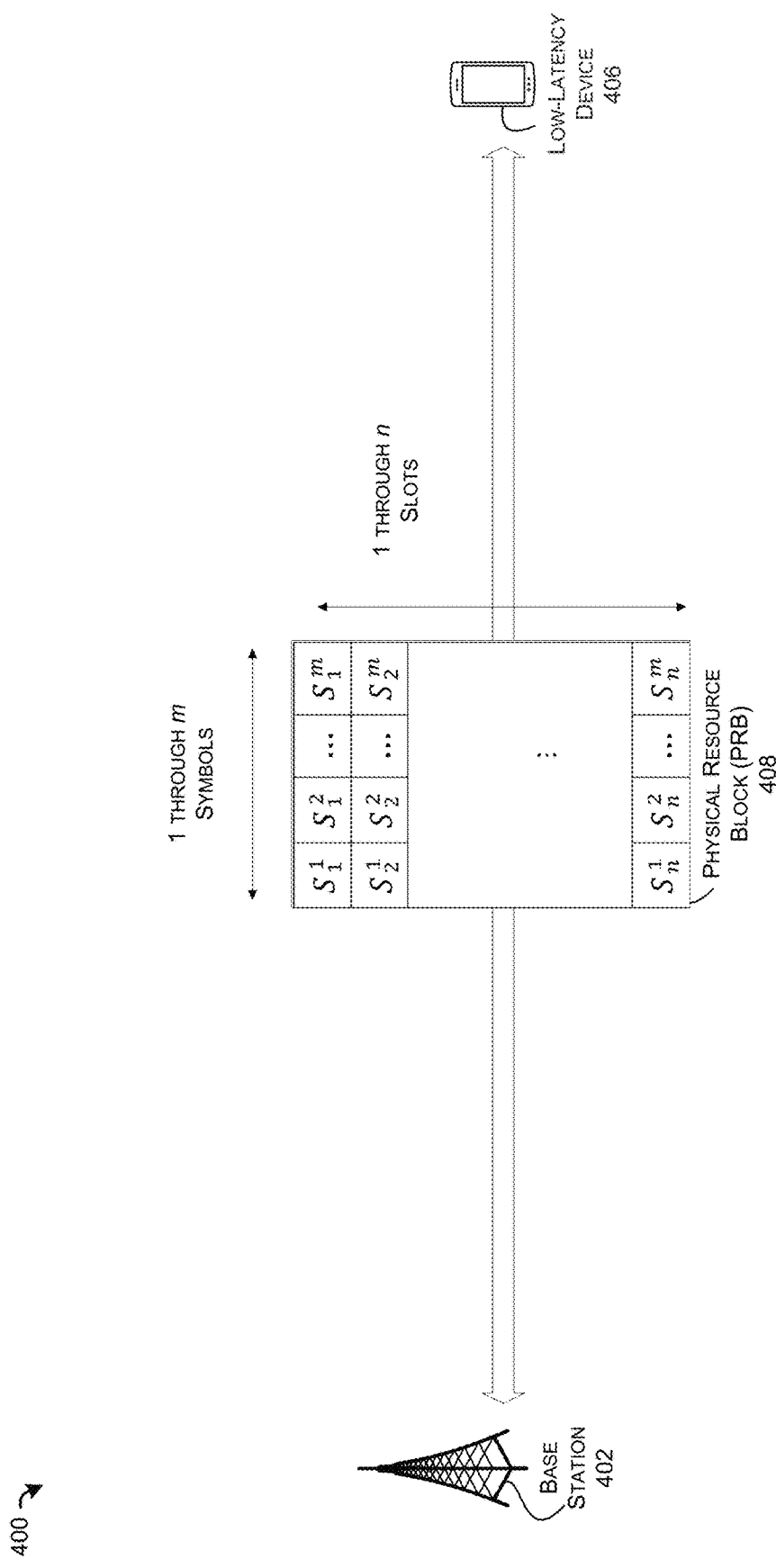
FIG. 4 illustrates an example of a communication environment in which a base station and a low-latency device exchange information in a scheduled communication according to various embodiments.

FIG. 4 illustrates an example of a communication environment 400 in which a base station 402 and a low-latency device 406 exchange information in a scheduled communication according to various embodiments.

The base station 402 and the device 406 can communicate by inserting uplink and/or downlink data in a Physical Resource Block (PRB) 408. In some implementations, the PRB 408 includes a plurality of slots, and each of the slots may include a plurality of symbols. Each symbol may include multiple bits of information. As illustrated in FIG. 4, the PRB 408 includes n slots and m symbols in each slot. In other words, the PRB 408 may include a total of m*n symbols. In some instances, the symbols are Orthogonal Frequency-Dimension Multiplexing (OFDM) symbols.

In various embodiments, the n slots of the PRB 408 are defined in the frequency dimension. For example, a first slot (e.g., $S_1^1$ to $S_1^m$) is defined in a first sub-carrier frequency range, and a second slot (e.g., $S_2^1$ to $S_2^m$) is defined in a second sub-carrier frequency range that is not identical to the first sub-carrier frequency range. In certain implementations, the first sub-carrier frequency range partially overlaps with the second sub-carrier frequency range or does not overlap with the second sub-carrier frequency range. The n slots in the PRB 408 may be defined according to a Sub-Carrier Spacing (SCS), for example.

In some embodiments, the m symbols in each slot are defined in the time dimension. For example, a first symbol in a particular slot (e.g., $S_1^1$) and a second symbol in the particular slot (e.g., $S_1^2$) are transmitted between the base station 402 and the low-latency device 406 in different time periods. For example, symbol $S_1^2$ may be transmitted after $S_1^1$.

With reference to FIG. 4, the PRB 408 may have a height defined in the frequency dimension and a width defined in the time dimension. In various embodiments, the PRB 408 includes 10 slots and each slot includes 14 symbols. The height of the PRB 408 may depend on the width of the PRB 408, and vice versa. An SCS can be selected based on $15*2^\mu$ kHz (where $\mu$=0, 1, 2, 3, 4). In some examples, the PRB 408 may have a SCS of 15 kHz and have a duration (e.g., a width) of 1 millisecond. In certain examples, the PRB 408 may have an SCS of 30 kHz and a duration of 0.5 milliseconds.

A number of bits in individual symbols of the PRB 408 may vary. The number of bits may depend, for example, on utilized modulation schemes such as Binary Phase-Shift Keying (BPSK), Quadrature Phase-Shift Keying (QPSK), Quadrature Amplitude Modulation (QAM), and the like. In some instances, when the low-latency device 406 is located in a mid-cell region and/or is experiencing a good Radio Frequency (RF) condition, a relatively higher modulation (e.g., 256 QAM) can be selected. In certain examples in which the low-latency device 406 is located in a cell-edge region and/or the RF condition is relatively poor, a lower modulation (e.g., 16 QAM or QPSK) can be selected. For example, a symbol of the PRB 408 may contain a greater number of bits when a higher modulation is selected, as compared to a scenario in which a lower modulation is selected. In some instances, the number of bits in individual symbols of the PRB 408 may depend on a fading condition experienced by the low-latency device 406. For example, in order to reduce the effects of inter-symbol interference during a fast-fading condition, intra-slot frequency hopping may be performed, thereby increasing the reliability of the transmission. However, inter-slot frequency hopping may also effectively reduce the number of usable symbols, and usable bits, in each slot of the PRB 408, in some cases.

The n*m symbols in the PRB 408 may include uplink information and downlink information. In some implementations, the n*m symbols in the PRB include uplink and downlink information associated with one or more devices, such as the device 406 and other devices. In various implementations, a downlink portion of the PRB 408 and an uplink portion of the PRB 408 may be separated, in the time dimension, by a transition time spanning one or more symbol-widths.

The PRB 408 may be scheduled, for example, by the base station 402 or by a separate device in communication with the base station 402. In various embodiments, the n*m symbols of the PRB are scheduled to carry at least one of data bits, uplink data, downlink data, one or more error-correcting codes, one or more error-detection codes, one or more acknowledgement messages, one or more transmissions, or one or more retransmissions. In some implementations, the PRB 408 includes HARQ signaling.

Figure 5:
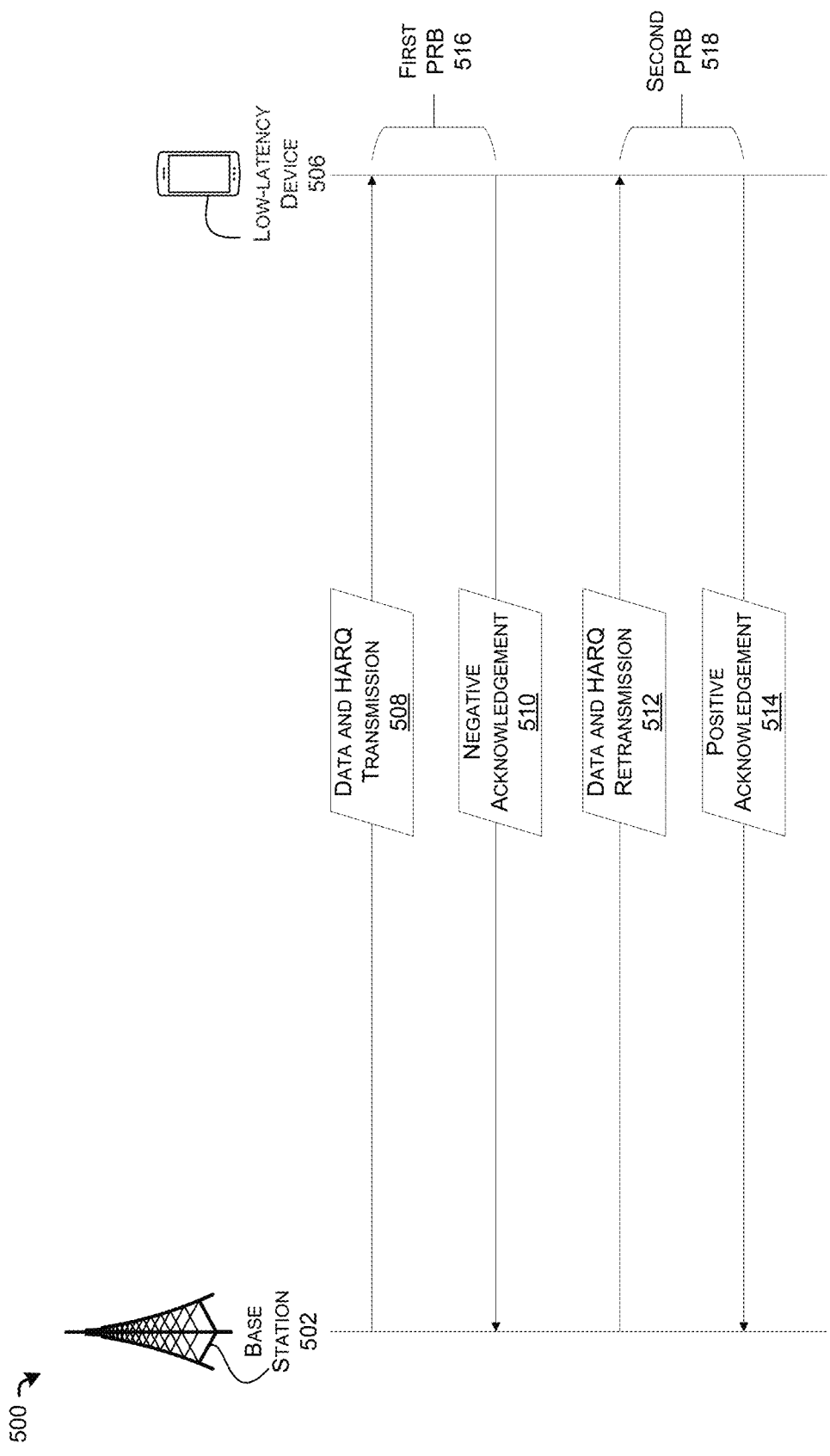
FIG. 5 illustrates Hybrid Automatic Repeat reQuest (HARQ) signaling between a base station and a low-latency device according to various embodiments.

FIG. 5 illustrates Hybrid Automatic Repeat reQuest (HARQ) signaling 500 between a base station 502 and a low-latency device 506 according to embodiments. In various implementations, the HARQ signaling 500 is activated for communications with relatively high reliability requirements. For example, Ultra Reliable Low-Latency Communication (URLLC) may utilize the HARQ signaling 500. In some implementations, the HARQ signaling 500 can be used in enhanced Mobile BroadBand (eMBB) communication.

The base station 502 may transmit data and HARQ transmission 508 to the low-latency device 506. The data and HARQ transmission 508 may be sent in a downlink portion of a Physical Resource Block (PRB), e.g., a first PRB 516. The data may include information corresponding to a substantive communication between the base station 502 and the device 506, such as at least a portion of URLLC services, eMBB services, and the like. The HARQ transmission may include an Error Detecting (ED) code and/or an Error Correction Code (ECC). The ED code may include, for example a repetition code, a parity bit, a checksum, a Cyclic Redundancy Check (CRC), a cryptographic hash function, or any ED known in the art. In some implementations the ECC includes at least one of a convolutional code or a block code. For example, the ECC can include at least one of a turbo code, a Low Density Parity Check (LDPC) code, a Forward Error Correction (FEC) code, (e.g., a Reed-Solomon code), a repetition code, a Hamming code, a multidimensional parity-check code, or any ECC known in the art.

In response to receiving the data and HARQ transmission 508, the low-latency device 506 may determine that there are one or more uncorrectable errors in the data and HARQ transmission 508 by using the ED code and/or the ECC code. Accordingly, the device 506 may transmit a negative acknowledgement 510 to the base station 502. In some cases, the negative acknowledgement 510 is a non-acknowledgement (NACK).

In various embodiments, the negative acknowledgement 510 is transmitted in one uplink symbol of a PRB. The negative acknowledgement 510 can be a type of feedback message. The negative acknowledgement 510 may include one or more bits in the uplink symbol. In some instances, the negative acknowledgement 510 is transmitted in the same PRB as the data and HARQ transmission 508, e.g., in an uplink symbol of the first PRB 516.

In some instances, upon determining that there are one or more uncorrectable errors in the data and HARQ transmission 508, the low-latency device 506 may retain the data and HARQ transmission 508. For example, the low-latency device 506 may store the data and HARQ transmission 508 in a local memory, e.g., a local buffer.

Upon receiving the negative acknowledgement 510, the base station 502 may send data and a HARQ retransmission 512 to the low-latency device 506. The base station 502 may transmit the data and HARQ retransmission 512 in one or more symbols of a PRB, e.g., a second PRB 518, and in a downlink channel. In some instances, the data and HARQ retransmission 512 contain the same information as the data and HARQ transmission 508. In certain instances, the data and HARQ retransmission 512 can include a portion of the data and HARQ transmission 508.

The low-latency device 506 may determine that the data and HARQ retransmission 512 includes correctable errors, if any. In some instances, the low-latency device 506 can obtain the data by combining the data and HARQ transmission 508 (which may be stored in the local memory of the low-latency device 506) and the data and HARQ retransmission 512. For example, the low-latency device 506 can perform chase combination on the data and HARQ transmission 508 and the data and HARQ retransmission 512.

In response to determining that the data and HARQ retransmission 512 includes correctable errors, if any, the low-latency device 506 may transmit a positive acknowledgement 514 to the base station 502. The positive acknowledgement 514 can be a type of feedback message. In various embodiments, the positive acknowledgement 514 is transmitted in one uplink symbol of a PRB. The positive acknowledgement 514 may include one or more bits in the uplink symbol. In some implementations, the positive acknowledgement 514 is transmitted in the same PRB as the data and HARQ retransmission 512, e.g., in an uplink portion of the second PRB 518. In some examples, the first PRB 516 and the second PRB 518 are the same PRB.

One or more components of the HARQ signaling 500 can be used to enhance a reliability of communication(s) between the base station 502 and the low-latency device 506. However, in some instances, the components of the HARQ signaling 500 may increase a latency of the communication(s) between the base station 502 and the device 506.

Figure 6:
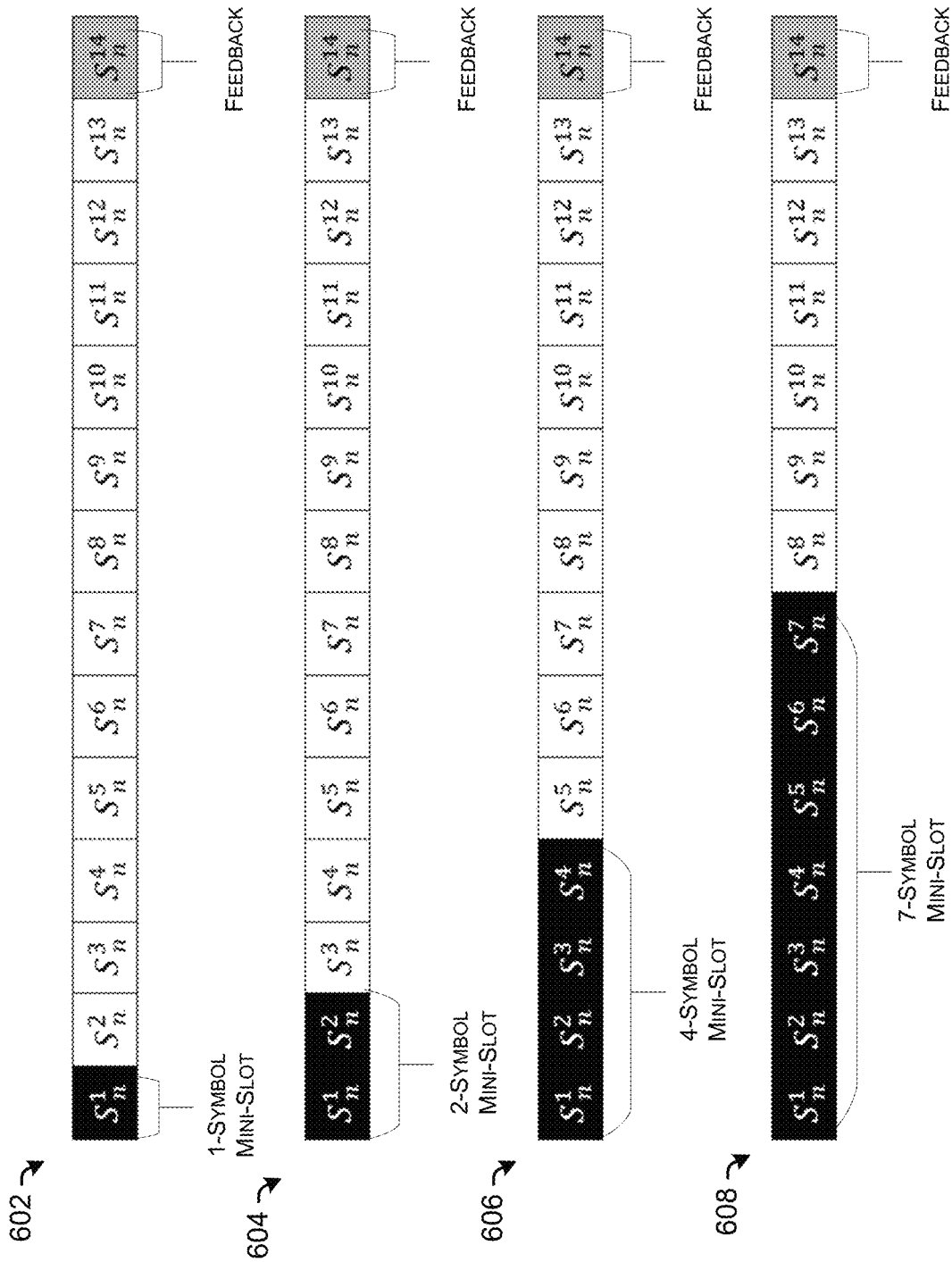
FIG. 6 illustrates mini-slots according to various embodiments.

FIG. 6 illustrates mini-slots according to various embodiments of the present disclosure. FIG. 6 depicts four example slots 602-608, each containing 14 symbols.

A first slot 602 includes a 1-symbol mini-slot. In some implementations, the first slot 602 further comprises a scheduled feedback message. As illustrated, the feedback message is scheduled in the last symbol of the first slot 602.

A second slot 604 includes a 2-symbol mini-slot. In some implementations, the second slot 604 further comprises a scheduled feedback message. As illustrated, the feedback message is scheduled in the last symbol of the second slot 604.

A third slot 606 includes a 4-symbol mini-slot. In some implementations, the third slot 606 further comprises a scheduled feedback message. As illustrated, the feedback message is scheduled in the last symbol of the third slot 606.

A fourth slot 608 includes a 7-symbol mini-slot. In some implementations, the fourth slot 608 further comprises a scheduled feedback message. As illustrated, the feedback message is scheduled in the last symbol of the fourth slot 608.

In various implementations of the present disclosure, information in a PRB (e.g., PRB 408) is scheduled on the mini-slot level. For example, at least one of HARQ transmissions, HARQ retransmissions, HARQ feedback messages, or data can be scheduled in mini-slots of a slot and/or PRB. In some implementations, mini-slot-level scheduling can reduce latency.

Single-Symbol Mini-Slots and Feedback Messages

In various embodiments, HARQ transmission(s) and HARQ feedback message(s) are scheduled in mini-slots of the same PRB. In certain examples, the HARQ transmission(s) and HARQ feedback message(s) are scheduled in the same slot. In some instances, the mini-slots can have a 1-symbol size based at least in part on one or more of a fading condition experienced by a device receiving the HARQ transmission(s) and transmitting the HARQ feedback message(s), a cell region where the device is located, a type of services received or transmitted by the device, or an RF condition.

Figure 7:
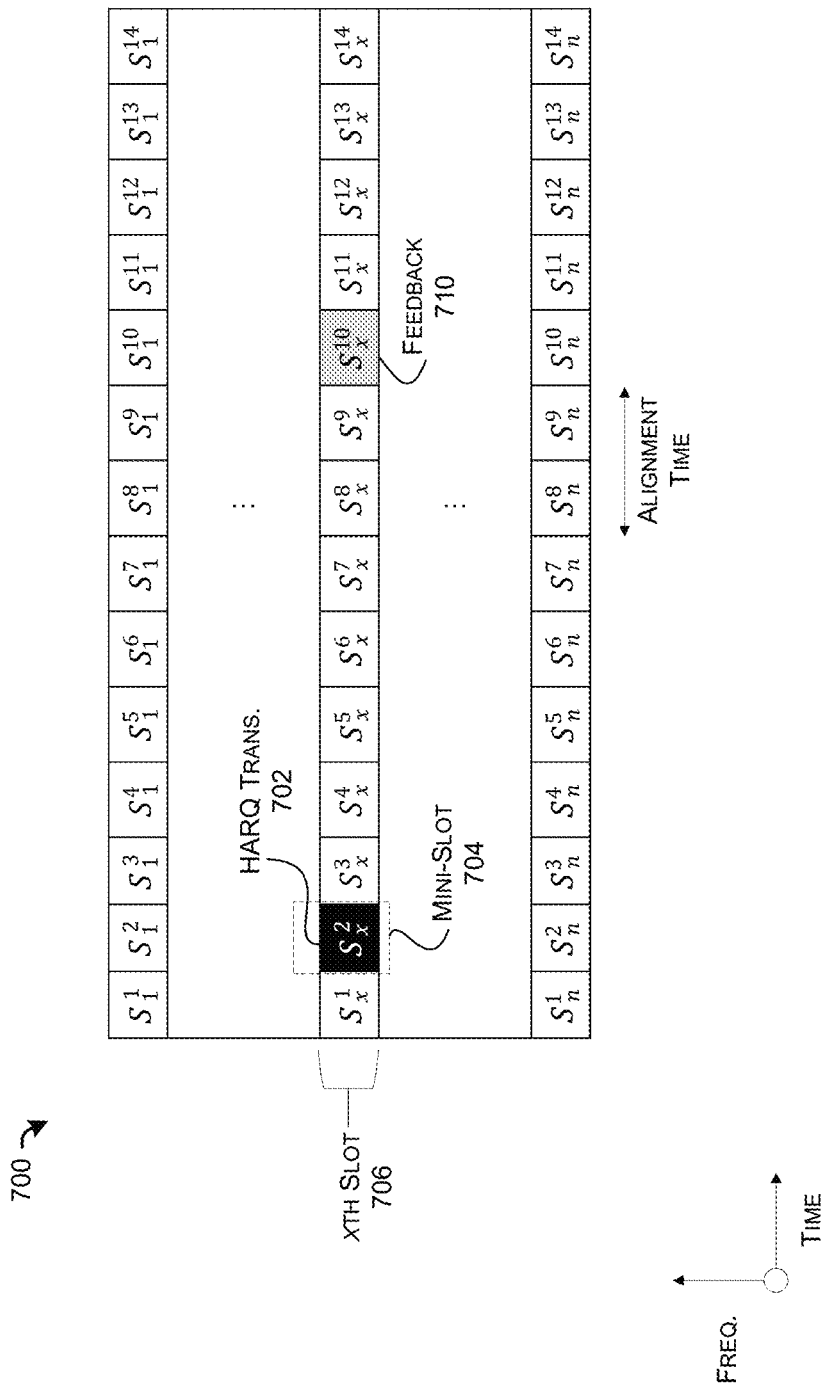
FIG. 7 illustrates an example of a scheduled Physical Resource Block (PRB) including a HARQ transmission scheduled in a 1-symbol mini-slot according to various embodiments.

FIG. 7 illustrates an example of a scheduled Physical Resource Block (PRB) 700 including a Hybrid Automatic Repeat reQuest (HARQ) transmission 702 scheduled in a 1-symbol mini-slot 704. In some implementations, the PRB 700 may be scheduled by the base station, a system controlling the base station, or another device. In some embodiments, the PRB 700 includes downlink data transmitted by the base station and uplink data transmitted by a device.

As illustrated, the PRB 700 includes a plurality of symbols arranged in a plurality of slots. The PRB 700 can include n slots, where n can be a positive integer. In the example illustrated in FIG. 7, each of the n slots is illustrated as including 14 symbols. With reference to FIG. 7, the frequency dimension may be in a vertical direction, and the time dimension may be in a horizontal direction.

The PRB 700 includes a HARQ transmission 702 that is scheduled in a 1-symbol mini-slot 704 of the PRB 700. The mini-slot 704 may be part of a downlink channel, such as a Physical Downlink Control CHannel (PDCCH). As illustrated in FIG. 7, the HARQ transmission 702 is scheduled in a symbol (e.g., $S_x^2$) that is in an xth slot 706, where $1 \leq x \leq n$, and that is in a first time interval with a width of one symbol. The xth slot may be defined by a first frequency interval.

In some embodiments, the PRB 700 is scheduled to include data bits. The data bits may include substantive information being communicated. For example, if a device requests Augmented Reality (AR) information as a URLLC, the data bits may include the AR information.

The PRB 700 may further include a HARQ feedback message 710. The HARQ feedback message 710 may be scheduled in a symbol (e.g., $S_x^{10}$) subsequent to the mini-slot 704 in which the HARQ transmission 702 is scheduled. In some implementations, the HARQ feedback message 710 is scheduled in the xth slot 706, in which the HARQ transmission 702 is scheduled. The HARQ feedback message 710 may be contained in a single symbol. In certain embodiments, the HARQ feedback message includes one or more bits in the single symbol.

The HARQ feedback message 710 may correspond to feedback related to the HARQ transmission 702 in the mini-slot 704. For example, the HARQ feedback message 710 may include an ACK or a NACK from a device that has received the HARQ transmission 702, according to whether the device has detected at least one uncorrectable error in the HARQ transmission 702, in data bits transmitted in the mini-slot 704, or both.

Although the HARQ transmission 702 and the HARQ feedback message 710 are scheduled in the same PRB 700, the mini-slot 704 containing the HARQ transmission 702 and the symbol containing the HARQ feedback message 710 may be separated by one or more symbols in the time domain. In some implementations, the HARQ transmission 702 and the HARQ feedback message 710 can be separated by an alignment time, which can allow one or more devices transmitting and receiving the PRB 700 to transition from uplink functionality to downlink functionality, or vice versa. For example, the alignment time may represent a time period for a base station to adjust from transmitting downlink information (e.g., data bits and the HARQ transmission 702) to receiving uplink information (e.g., the HARQ feedback message 710). In some examples, the alignment time may represent a time period for a device to adjust from receiving the downlink information to transmitting the uplink information. For example, the alignment time may include a guard time to transition between downlink and uplink transmissions in a Time-Division Duplexing (TDD) or Time-Division Multiplexing (TDM) system. The alignment time can span one or more symbols according to various embodiments. In an example illustrated in FIG. 7, the alignment time can have the width of two symbols (e.g., $S_{1-n}^8$ to $S_{1-n}^9$).

In some implementations, the PRB 700 is scheduled by a base station when a device receiving the HARQ transmission 702 is located in a mid-cell region of the base station. In certain embodiments, the HARQ transmission 702 is scheduled in a wider mini-slot (e.g., a 2-, 4-, or 7-symbol mini-slot) when the device is located in a cell-edge region of the base station.

In various embodiments, the data bits scheduled in the PRB 700 may correspond to a type of communication with a relatively small packet size. For example, the data bits may correspond to at least one of factory automation data, AR data, or Virtual Reality (VR) data. In some embodiments, the HARQ transmission 702 is scheduled in a wider mini-slot (e.g., a 2-, 4-, or 7-symbol mini-slot) when the data bits correspond to a type of communication with a relatively large packet size (e.g., information used to control a self-driving car).

In some embodiments, the mini-slot 704 can include symbols of multiple slots in the PRB 700. For example, the mini-slot 704 may further include a symbol of a yth slot (not pictured), where $1 \leq y \leq n$ and $x \neq y$, which is defined by a second frequency interval. In various implementations, the HARQ transmission 702 is constrained to a time period (e.g., the first time interval) that is the width of one symbol in the PRB 700. In some examples, the mini-slot 704 may include one or more of symbols $S_1^2$ through $S_n^2$. According to various implementations, the HARQ transmission 702 may be scheduled in at least a portion of the mini-slot 704.

Figure 8:
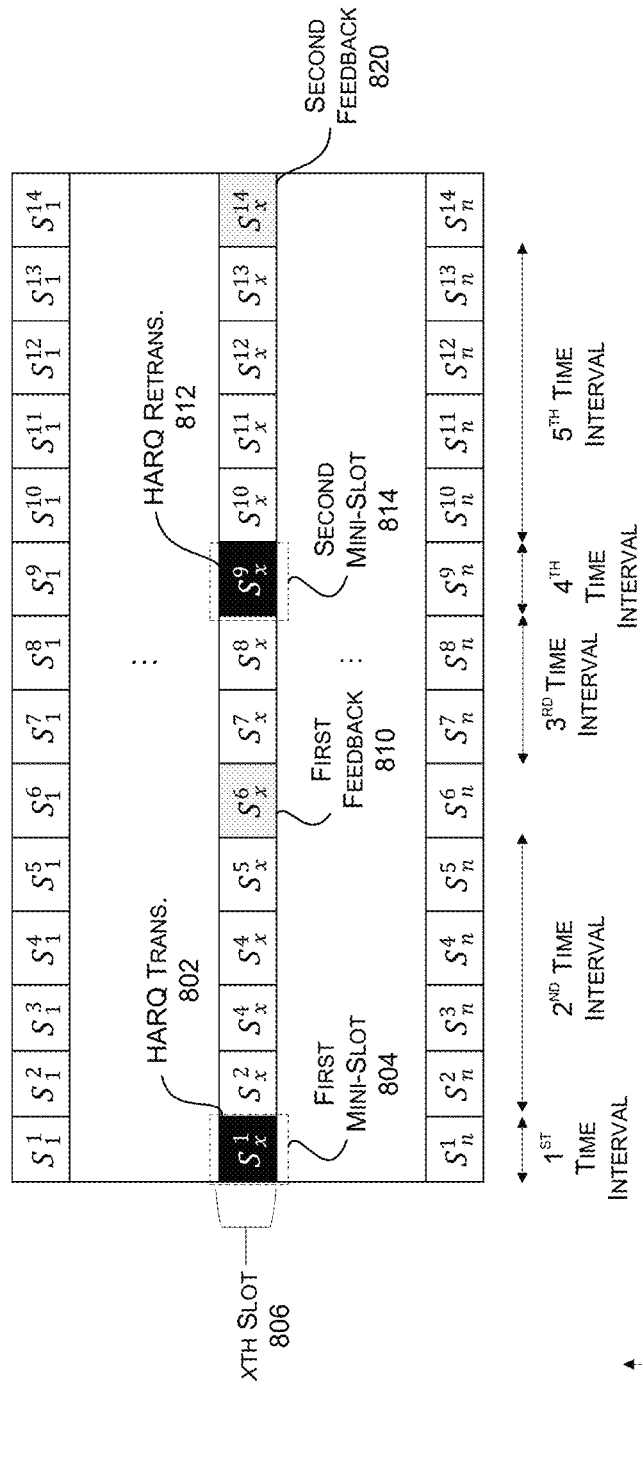
FIG. 8 illustrates an example of a scheduled PRB including both a HARQ transmission and a HARQ retransmission according to various embodiments.

FIG. 8 illustrates an example of a scheduled Physical Resource Block (PRB) 800 including both a Hybrid Automatic Repeat reQuest (HARQ) transmission and a HARQ retransmission. In some implementations, the PRB 800 may be scheduled by the base station, a system controlling the base station, or another device. In some embodiments, the PRB 800 includes downlink data transmitted by the base station and uplink data transmitted by a device.

As illustrated, the PRB 800 includes a plurality of symbols arranged in a plurality of slots. The PRB 800 can include n slots, where n can be a positive integer. In the example illustrated in FIG. 8, each of the n slots is illustrated as including 14 symbols. With reference to FIG. 8, the frequency dimension may be in a vertical direction, and the time dimension may be in a horizontal direction.

The PRB 800 includes a HARQ transmission 802 that is scheduled in a 1-symbol first mini-slot 804 of the PRB 800. The first mini-slot 804 may be part of a downlink channel, such as a Physical Downlink Control CHannel (PDCCH). As illustrated in FIG. 8, the HARQ transmission 802 is scheduled in a symbol (e.g., $S_x^1$) that is in an xth slot 806, where 1≤x≤n, and that is in a first time interval with a width of one symbol. The xth slot may be defined by a first frequency interval.

The PRB 800 may further include a first HARQ feedback message 810. The first HARQ feedback message 810 may be scheduled in a symbol (e.g., $S_x^6$) subsequent to the first mini-slot 804 in which the HARQ transmission 802 is scheduled. In some implementations, the first HARQ feedback message 810 is scheduled in the xth slot 806, in which the HARQ transmission 802 is also scheduled. The first HARQ feedback message 810 may be contained in a single symbol.

In some instances, the HARQ transmission 802 and the first HARQ feedback message 810 are separated by a second time interval. In some embodiments, the second time interval can include an alignment time. In certain embodiments, the second time interval can include a processing time for the device receiving the HARQ transmission 802 and transmitting the first HARQ feedback message 810. In the example illustrated in FIG. 8, the alignment time can span the width of two symbols (e.g., $S_{1-n}^4$-$S_{1-n}^5$), and the processing time can span the width of two symbols (e.g., $S_{1-n}^2$-$S_{1-n}^3$).

In some embodiments, a HARQ retransmission 812 is scheduled subsequent to the first HARQ feedback message 810. In certain instances, the first HARQ feedback message 810 and the HARQ retransmission 812 are separated by a third time interval. For example, the third time interval can include a processing time of a base station that receives the first HARQ feedback message 810 and transmits the HARQ retransmission 812. During the processing time, the base station may determine whether to transmit the HARQ retransmission 812 based on the first HARQ feedback message 810. In specific examples, the base station may determine that the first HARQ feedback message 810 is a NACK, and decide to transmit the HARQ retransmission 812 in response to the NACK, during the processing time.

The PRB 800 may also include the HARQ retransmission 812 that is scheduled in a 1-symbol second mini-slot 814 of the PRB 800. The second mini-slot 814 may be part of a downlink channel, such as a PDCCH. As illustrated in FIG. 8, the HARQ retransmission 812 is scheduled in a symbol (e.g., $S_x^9$) that is in the xth slot 806 and that is in a time interval with a width of one symbol. The HARQ retransmission 812 may be scheduled subsequent to the HARQ transmission 802. In certain implementations, the HARQ retransmission 812 is scheduled subsequent to both the HARQ transmission 802 and the first HARQ feedback message 810. In some embodiments, the HARQ retransmission 812 can be further scheduled in symbols of other slots in the PRB 800. In various implementations, the HARQ retransmission 812 is constrained to a time period (e.g., the third time interval) that is the width of one symbol in the PRB 800.

A second HARQ feedback message 820, corresponding to the HARQ retransmission 812, may also be scheduled in the PRB 800. The second HARQ feedback message 820 may be scheduled in a symbol (e.g., $S_x^{14}$) subsequent to the second mini-slot 814 in which the HARQ retransmission 812 is scheduled. In some implementations, the second HARQ feedback message 820 is scheduled in a slot (e.g., the xth slot 806) in which the HARQ retransmission 812 is scheduled. The second HARQ feedback message 820 may be contained in a single symbol.

In some instances, the HARQ retransmission 812 and the second HARQ feedback message 820 are separated by a fifth time interval. In some embodiments, the fifth time interval can include an alignment time. In certain embodiments, the fifth time interval can include a processing time for the device receiving the HARQ retransmission 812 and transmitting the second HARQ feedback message 820. In the example illustrated in FIG. 8, the alignment time can span two symbols, and the processing time can span two symbols.

In some embodiments, the scheduling of the HARQ retransmission 812 and the second HARQ feedback message 820 may be conditioned on the first HARQ feedback message 810 including a NACK. In certain embodiments, the HARQ retransmission 812 may be selectively transmitted when there are one or more uncorrectable errors in the HARQ transmission 802 as-received. In some instances, the HARQ retransmission 812 and the second HARQ feedback message 820 may be scheduled in the PRB 800 regardless of whether the first HARQ feedback message 810 includes a NACK. That is, in some instances, the HARQ retransmission 812 and the second HARQ feedback message 820 may be scheduled automatically, rather than in response to the first HARQ feedback message 810.

According to various embodiments of the present disclosure, the PRB 800 can include the HARQ transmission 802, the first HARQ feedback message 810, the HARQ retransmission 812, and the second HARQ feedback message 820. The PRB 800 may be associated with a lower latency than HARQ transmissions and retransmissions scheduled in multiple PRBs.

The first mini-slot 804 may be defined as a single symbol in a single slot (e.g., symbol $S_x^1$ in the slot 806) or may be defined as multiple symbols in one or more slots. In various embodiments, the first mini-slot 804 has a width of a single symbol. For example, the first mini-slot 804 may include one or more of symbols $S_1^1$ through $S_n^1$. According to various implementations, the HARQ transmission 802 may be scheduled in at least a portion of the first mini-slot 804.

Similarly, the second mini-slot 814 may be defined as a single symbol in a single slot (e.g., symbol $S_x^9$ in the slot 806) or may be defined as multiple symbols in one or more slots. In various embodiments, the second mini-slot 814 has a width of a single symbol. For example, the second mini-slot 814 may include one or more of symbols $S_1^9$ through $S_n^9$. According to various implementations, the HARQ retransmission 812 may be scheduled in at least a portion of the second mini-slot 814.

Figure 9:
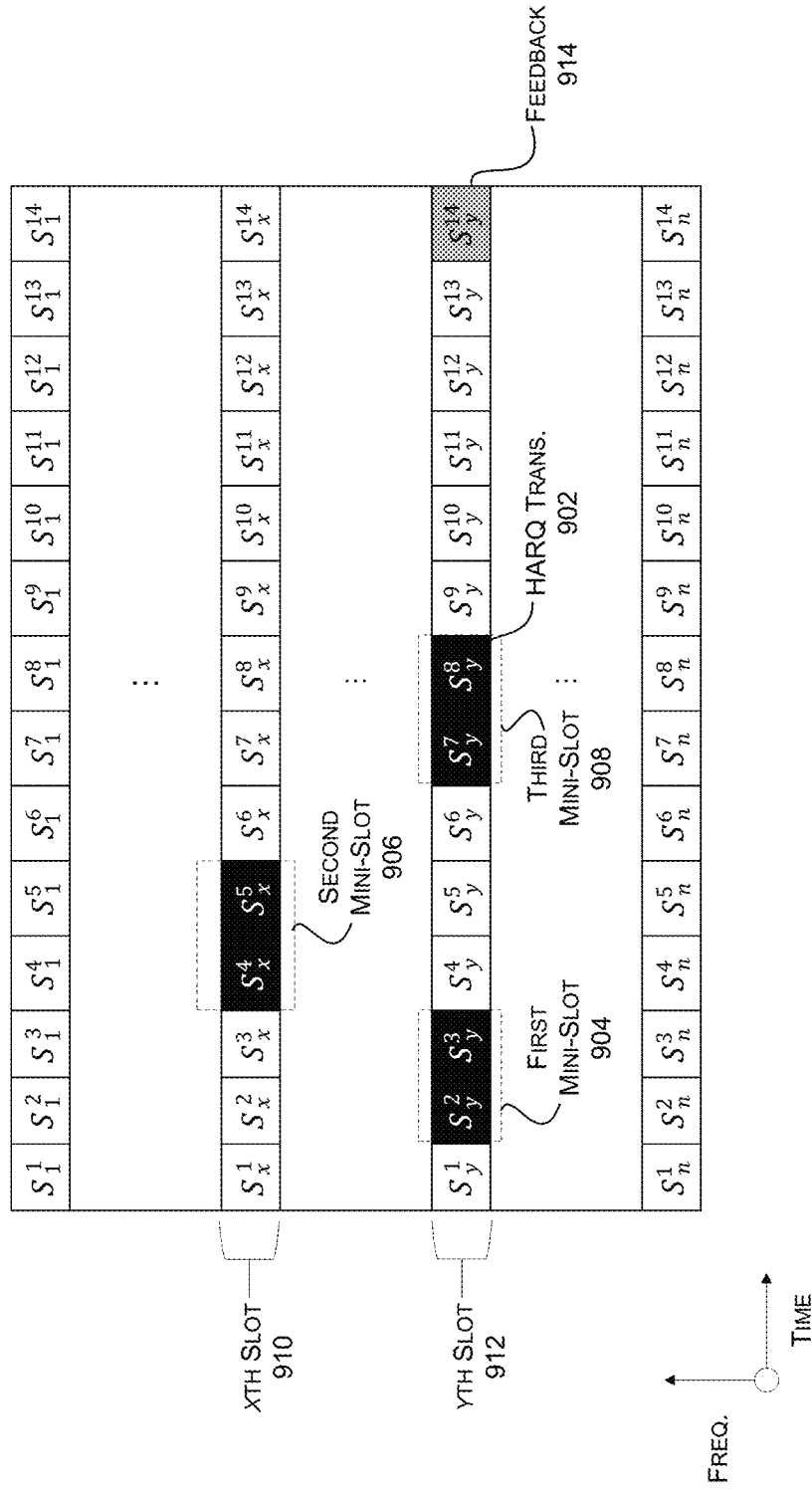
FIG. 9 illustrates an example of a scheduled PRB including a HARQ transmission in multiple mini-slots and a single HARQ feedback message according to various embodiments.

FIG. 9 illustrates an example of a scheduled Physical Resource Block (PRB) 900 including a Hybrid Automatic Repeat reQuest (HARQ) transmission in multiple mini-slots and a single HARQ feedback message. In some implementations, the PRB 900 may be scheduled by the base station, a system controlling the base station, or another device. In some embodiments, the PRB 900 includes downlink data transmitted by the base station and uplink data transmitted by a device.

As illustrated, the PRB 900 includes a plurality of symbols arranged in a plurality of slots. The PRB 900 can include n slots, where n can be a positive integer. In the example illustrated in FIG. 9, each of the n slots is illustrated as including 14 symbols. With reference to FIG. 9, the frequency dimension may be in a vertical direction, and the time dimension may be in a horizontal direction. As illustrated, the PRB 900 can include an xth slot 910 and a yth slot 912, where 1≤x≤y≤n.

The PRB 900 includes a HARQ transmission 902 that is scheduled in multiple mini-slots 904, 906, and 908 of the PRB 900. The mini-slots 904, 906, and 908 may be part of a downlink channel, such as a Physical Downlink Control CHannel (PDCCH). As illustrated in FIG. 9, the HARQ transmission 902 is scheduled in first, second, and third mini-slots 904, 906, and 908. The HARQ transmission 902 may be scheduled in one or more slots. For example, the HARQ transmission 902 can be scheduled in both the xth slot 910 and the yth slot 912. The HARQ transmission 902 may be scheduled in one or more symbols (e.g., $S_y^2$ and $S_y^3$) in the first mini-slot 904, one or more symbols (e.g., $S_x^4$ and $S_x^5$) in the second mini-slot 906, and/or in one or more symbols (e.g., $S_y^7$ and $S_y^8$) in the third mini-slot 908. In some embodiments, the multiple mini-slots 904, 906, and 908 may overlap in the frequency domain and/or the time domain.

Although the HARQ transmission 902 can be scheduled in multiple mini-slots 904, 906, and 908 of the PRB 900, the PRB 900 may include a single HARQ feedback message 914. The HARQ feedback message 914 may be scheduled in a single symbol (e.g., $S_y^{14}$) of the PRB 900, in some embodiments. The single symbol may be scheduled at a subsequent time to the HARQ transmission 902 (e.g., subsequent to the first, second, and third mini-slots 904, 906, and 908). The single symbol may be part of an uplink channel. In some instances, the single symbol is the final or last symbol of one of the slots in the PRB 900. For example, the single symbol can be the last symbol of the yth slot 912.

The HARQ feedback message 914 may correspond to feedback from the device related to the HARQ transmission 902 in the first mini-slot 904, the second mini-slot 906, and/or the third mini-slot 908. For example, the HARQ feedback message 914 may include an ACK or a NACK from the device related to whether the device has detected an uncorrectable error in the HARQ transmission 902 in any of the first mini-slot 904, the second mini-slot 906, or the third mini-slot 908, in data bits transmitted in the PRB 900, or both.

The PRB 900 therefore contains a HARQ transmission scheduled in multiple mini-slots and a single, self-contained acknowledgement. In some embodiments, the PRB 900 can contain data bits that are transmitted with high reliability due to the presence of the HARQ transmission and HARQ feedback. Furthermore, in some embodiments, the data bits can be transmitted with a low latency since the HARQ transmission and the HARQ feedback are scheduled in the same PRB. Additionally, scheduling a single HARQ feedback that corresponds to multiple mini-slots further reduces the latency associated with transmitting and receiving data bits reliably in the PRB 900.

Although FIG. 9 depicts that each of the mini-slots 904, 906, and 908 has a width of two symbols, in some embodiments, one or more of the mini-slots 904, 906, and 908 may have a size of one symbol, four symbols, seven symbols, or other sizes. Furthermore, although FIG. 9 depicts that each of the slots (e.g., first and second slots 910 and 912) includes fourteen symbols, in other embodiments, the slots can have a different number of symbols. According to some embodiments, the HARQ transmission can be scheduled in more than three mini-slots of the PRB 900, or less than three mini-slots of the PRB 900. In certain implementations, the PRB 900 includes a single scheduled HARQ feedback message, regardless of the number of mini-slots scheduled to include the HARQ transmission.

In some embodiments, any of the first, second, and third mini-slots 904, 906, and 908 can be defined as symbols in multiple slots. For example, the first mini-slot 804 may be defined as one or more symbols in a single slot (e.g., symbols $S_y^2$ and $S_y^3$ in the yth slot 912) or may be defined as multiple symbols in one or more slots (e.g., $S_x^2$, $S_x^3$, $S_y^2$, and $S_y^3$ in the xth slot 910 and the yth slot 912). In various embodiments, the first mini-slot 904 has a width of a multiple symbols. According to various implementations, the HARQ retransmission 902 may be scheduled in at least a portion of the first mini-slot 904.

Figure 10:
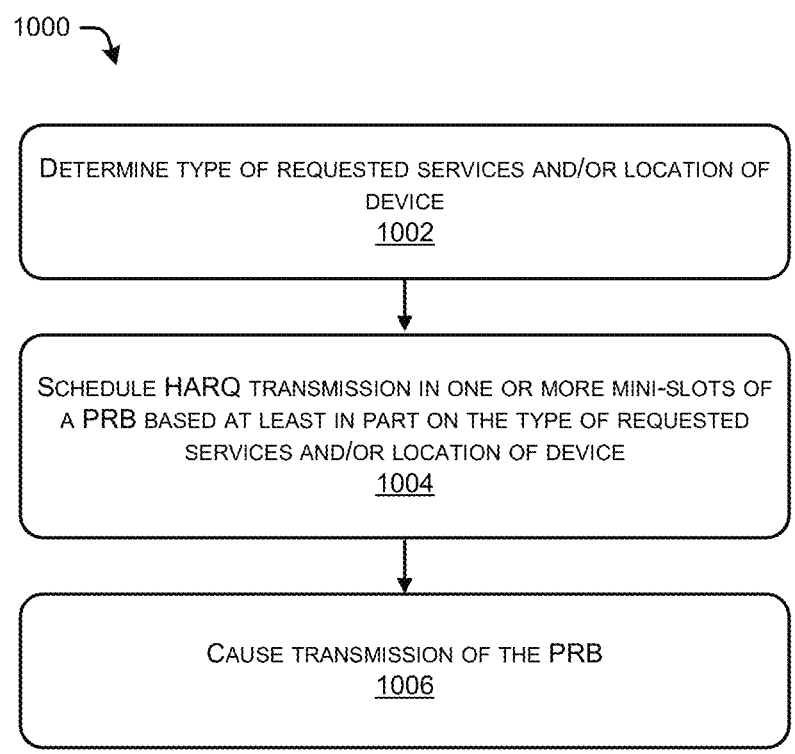
FIG. 10 illustrates a process for scheduling a PRB according to various embodiments.

FIG. 10 illustrates a process 1000 for scheduling a Physical Resource Block (PRB) according to embodiments of the present disclosure. In various embodiments, process 1000 can be performed by a base station or a device controlling a base station.

At 1002, a type of requested services and/or a location of a device is determined. In some embodiments, the type of requested services is a type of services requested by the device. In various implementations, the requested services can be any of Ultra Reliable Low-Latency Communication (URLLC) services, enhanced Mobile BroadBand (eMBB) services, or another type of low-latency services. In some instances, a size of data packets associated with the requested services is determined. The location of the device may be a location in a cell region. For instance, the device may be determined to be in a mid-cell region or a cell-edge region.

At 1004, a Hybrid Automatic Repeat reQuest (HARQ) transmission is scheduled in mini-slots of a PRB based at least in part on the type of requested services and/or the location of the device. In some embodiments, the HARQ transmission is scheduled in one or more single-symbol mini-slots when the requested services are associated with relatively small data packets (e.g., factory automation services, Augmented Reality (AR) services, Virtual Reality (VR) services, and the like). In certain embodiments, the HARQ transmission is scheduled in one or more multiple-symbol mini-slots when the requested services are associated with relatively large data packets (e.g., self-driving car control information, remote surgery control information, etc.). In some instances, the HARQ transmission is scheduled in one or more single-symbol mini-slots when the device is in a mid-cell region. In certain instances, the HARQ transmission is scheduled in one or more multiple-symbol mini-slots when the device is in a cell-edge region. The device may be identified as being in the mid-cell region or the cell-edge region based on a Round Trip Delay (RTD) and/or a Timing Advance (TA) of one or more data packets transmitted between the base station and the device.

At 1006, the process 1000 includes causing transmission of the PRB. In some examples, data indicative of the scheduled PRB is provided to a device with a transmitter, e.g., a base station. The device with the transmitter may transmit downlink information in the PRB, such as the HARQ transmission. In some instances, another device may transmit uplink information in the PRB, such as a HARQ feedback message. In some instances, the device performing process 1000 transmits and receives information in the PRB.

Figure 11:
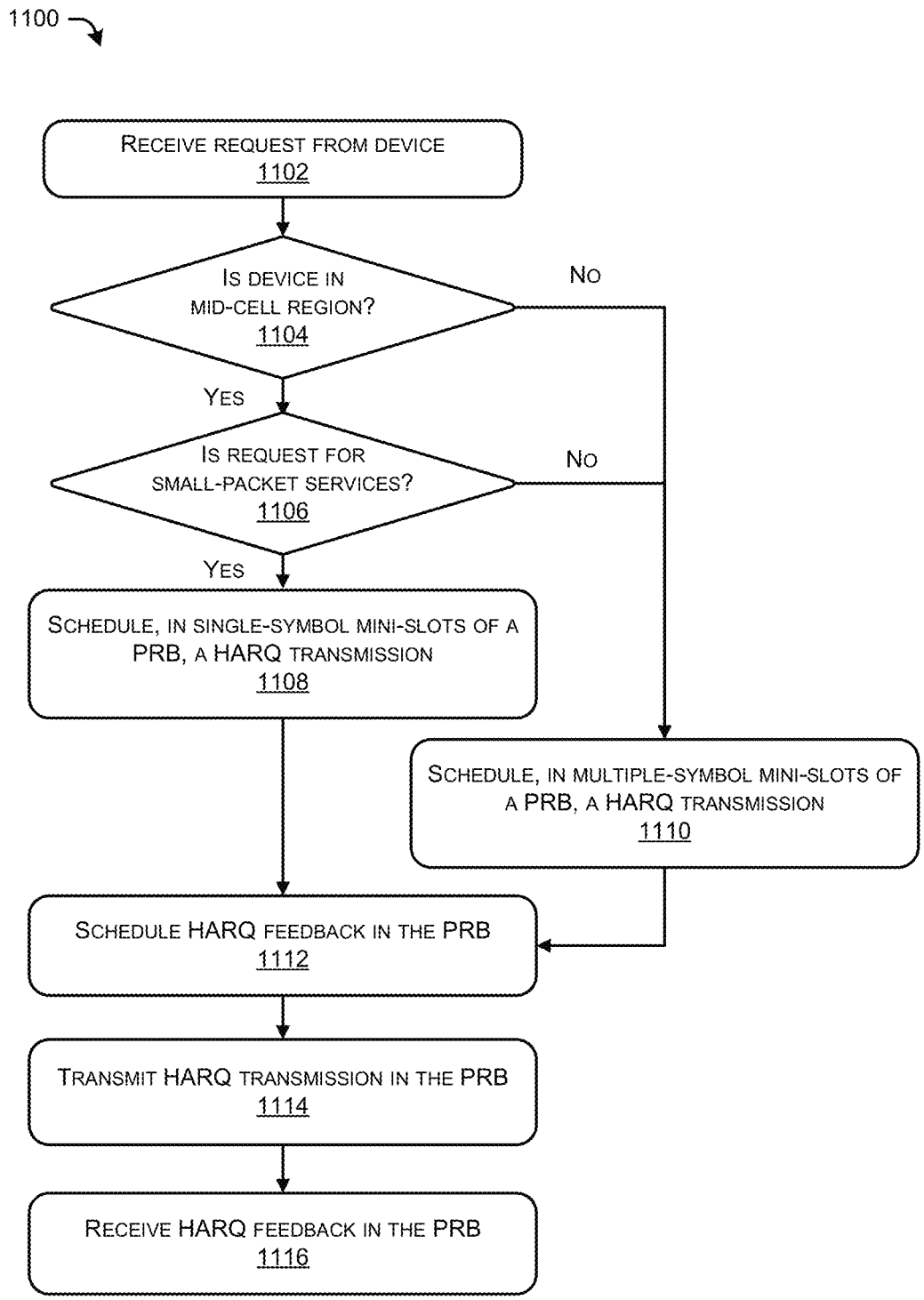
FIG. 11 illustrates a process for scheduling, transmitting, and receiving a PRB according to various embodiments.

FIG. 11 illustrates a process 1100 for scheduling, transmitting, and receiving a Physical Resource Block (PRB) according to embodiments of the present disclosure. Process 1100 may be performed by a base station, for example.

At 1102, a request is received from a device. In some instances, the request is received wirelessly from the device. The request may be a request for low-latency services, such as Ultra Reliable Low Latency Communication (URLLC) services, enhanced Mobile BroadBand (eMBB) services, etc. The device may be located in a cell region.

At 1104, the process 1100 includes determining whether the device is in a mid-cell region. In some examples, the request indicates whether the device is in the mid-cell region or a cell-edge region. For example, the request may be determined to be in the mid-cell region based at least in part on any of a Signal-to-Noise Ratio (SNR) of a signal received from the device, a Received Signal Strength Indication (RSSI) of a signal received from the device, a Round-Trip Delay (RTD) of one or more messages exchanged with the device, a Timing Advance (TA) of one or more messages exchanged with the device, or the like.

If the device is determined to be in a mid-cell region, the process 1100 continues to 1106. At 1106, the process 1100 includes determining whether the request is for small-packet services. For example, the request may be determined to be for small-packet services when the request is for at least one of factory automation services factory automation services, AR services, VR services, or the like.

If the device is determined to be in a mid-cell region and the request is determined to be for small-packet services, the process 1100 continues to 1108. At 1108, the process 1100 includes scheduling a HARQ transmission in single-symbol mini-slots of a PRB. The single-symbol mini-slots may be scheduled to overlap in the time domain, overlap in the frequency domain, be staggered in the time domain, be staggered in the frequency domain, or a combination thereof.

However, if the device is determined to not be in the mid-cell region and/or the services are determined to not be for small-packet services (e.g., the services are determined to be for large-packet services), the process 1100 continues to 1110. At 1110, the process includes scheduling a HARQ transmission in multiple-symbol mini-slots of a PRB. In some implementations, any of the multiple-symbol mini-slots may include two symbols, four symbols, or seven symbols.

At 1112, HARQ feedback is scheduled in the PRB. The HARQ feedback may include one or more HARQ feedback messages scheduled in one or more symbols of the PRB. The HARQ feedback may be scheduled in one or more symbols that are subsequent to the mini-slots of the HARQ transmission.

At 1114, the HARQ transmission is transmitted in the PRB. For example, the HARQ transmission can be transmitted wirelessly via a transmitter and/or a transceiver. The HARQ transmission may be transmitted to the device originating the request received at 1102.

At 1116, the HARQ feedback is received. For example, the HARQ feedback may be received wirelessly via a receiver or a transceiver. The HARQ feedback may be received from the device originating the request received at 1102.

Figure 12:
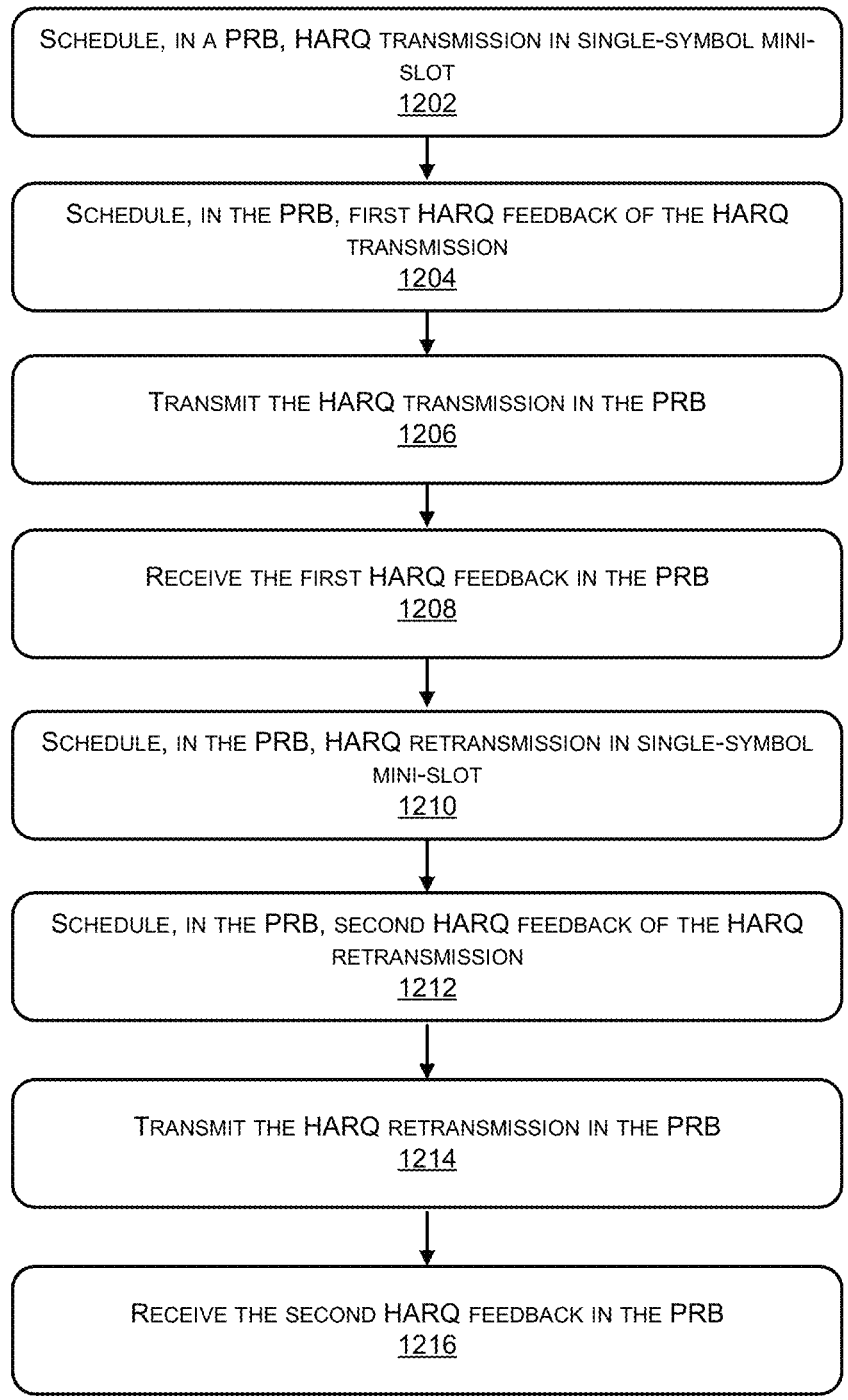
FIG. 12 illustrates a process for scheduling a HARQ transmission and HARQ retransmission in the same PRB according to various embodiments.

FIG. 12 illustrates a process 1200 for scheduling a Hybrid Automatic Repeat reQuest (HARQ) transmission and HARQ retransmission in the same Physical Resource Block (PRB) according to embodiments.

At 1202, a HARQ transmission is scheduled in a single-symbol mini-slot. In some embodiments, 1202 is performed in response to receiving a request from a device, determining the device is in a mid-cell region, determining the request is for small-packet services, or a combination thereof. In some examples, the request is for a type of low-latency services, such as Ultra Reliable Low-Latency Communication (URLLC) services, enhanced Mobile BroadBand (eMBB) services, and the like.

At 1204, first HARQ feedback of the HARQ transmission is scheduled in the PRB. The first HARQ feedback may include one or more HARQ feedback messages, for example. The first HARQ feedback may be scheduled in a time interval subsequent to a time interval in which the HARQ transmission is scheduled.

At 1206, the HARQ transmission is transmitted in the PRB. The HARQ transmission may be transmitted via a transmitter and/or a transceiver. In some embodiments, the HARQ transmission is transmitted to the device.

At 1208, the first HARQ feedback is received in the PRB. The first HARQ feedback may be received via a receiver or a transceiver. In some embodiments, the first HARQ feedback is received from the device. In particular embodiments, the first HARQ feedback is a positive acknowledgement, e.g., an acknowledgement (ACK), which may indicate that the device has received no uncorrectable errors in the HARQ transmission, or a negative acknowledgement, e.g., a non-acknowledgement (NACK), which may indicate that the device has received one or more uncorrectable errors in the HARQ transmission.

At 1210, a HARQ retransmission is scheduled in the PRB. In certain implementations the HARQ retransmission may be scheduled in response to determining that the first HARQ feedback is a NACK. In some embodiments, the HARQ retransmission is scheduled regardless of whether the first HARQ feedback is a NACK.

At 1212, second HARQ feedback of the HARQ retransmission is scheduled in the PRB. The second HARQ feedback may include one or more HARQ feedback messages, for example. The second HARQ feedback may be scheduled in a time interval subsequent to a time interval in which the HARQ retransmission is scheduled.

At 1214, the HARQ retransmission is transmitted in the PRB. The HARQ transmission may be transmitted via a transmitter and/or a transceiver. In some embodiments, the HARQ transmission is transmitted to the device.

At 1216, the second HARQ feedback is received in the PRB. In some embodiments, the second HARQ feedback is received from the device. In particular embodiments, the second HARQ feedback is an ACK, which may indicate that the device has received no uncorrectable errors in the HARQ retransmission, or a NACK, which may indicate that the device has received one or more uncorrectable errors in the HARQ retransmission.

Figure 13:
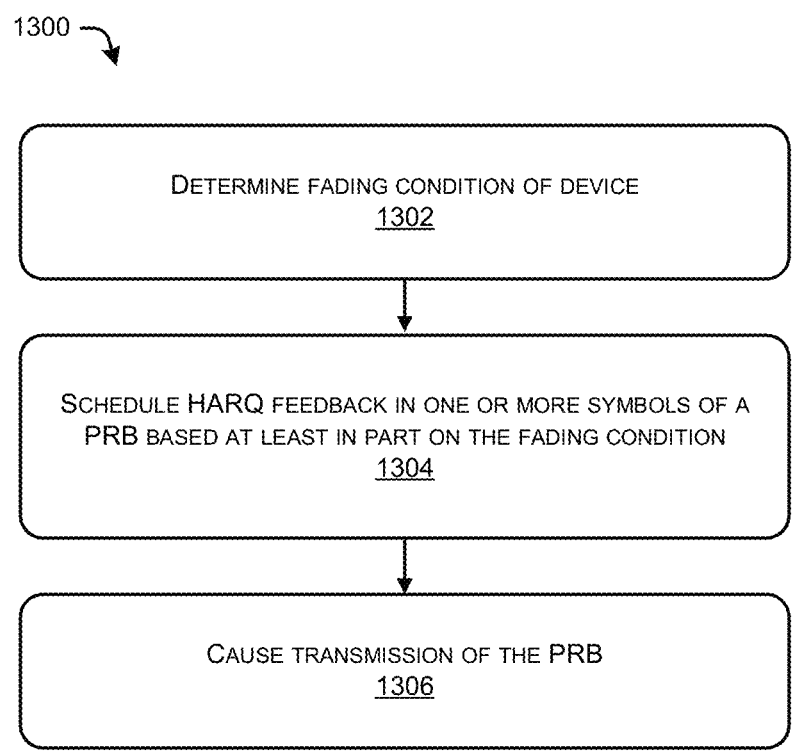
FIG. 13 illustrates a process for scheduling HARQ feedback in a PRB according to various embodiments.

FIG. 13 illustrates a process 1300 for scheduling Hybrid Automatic Repeat reQuest (HARQ) feedback in a Physical Resource Block (PRB) according to embodiments. The process 1300 may be performed by a base station, or a device controlling a base station, according to various embodiments.

At 1302, a fading condition of a device is determined. For example, the device may be determined to be experiencing a fast-fading condition or a slow-fading condition.

At 1304, HARQ feedback is scheduled in one or more symbols of a PRB based at least in part on the fading condition. In various embodiments, the HARQ feedback indicates whether a device has received any non-correctable errors in a HARQ transmission. The HARQ transmission may be scheduled in multiple mini-slots of the PRB. In some implementations, the HARQ feedback is scheduled in multiple symbols of the PRB when the fading condition is determined to be a fast-fading condition. In some embodiments, the HARQ feedback is scheduled in a single symbol of the PRB when the fading condition is determined to be a slow-fading condition.

At 1306, the process 1300 includes causing transmission of the PRB. In some examples, data indicative of the scheduled PRB is provided to a device with a transmitter, e.g., a base station. The device with the transmitter may transmit downlink information in the PRB, such as the HARQ transmission. In some instances, another device may transmit uplink information in the PRB, such as a HARQ feedback. In some instances, the device performing process 1300 transmits and receives information in the PRB.

Figure 14:
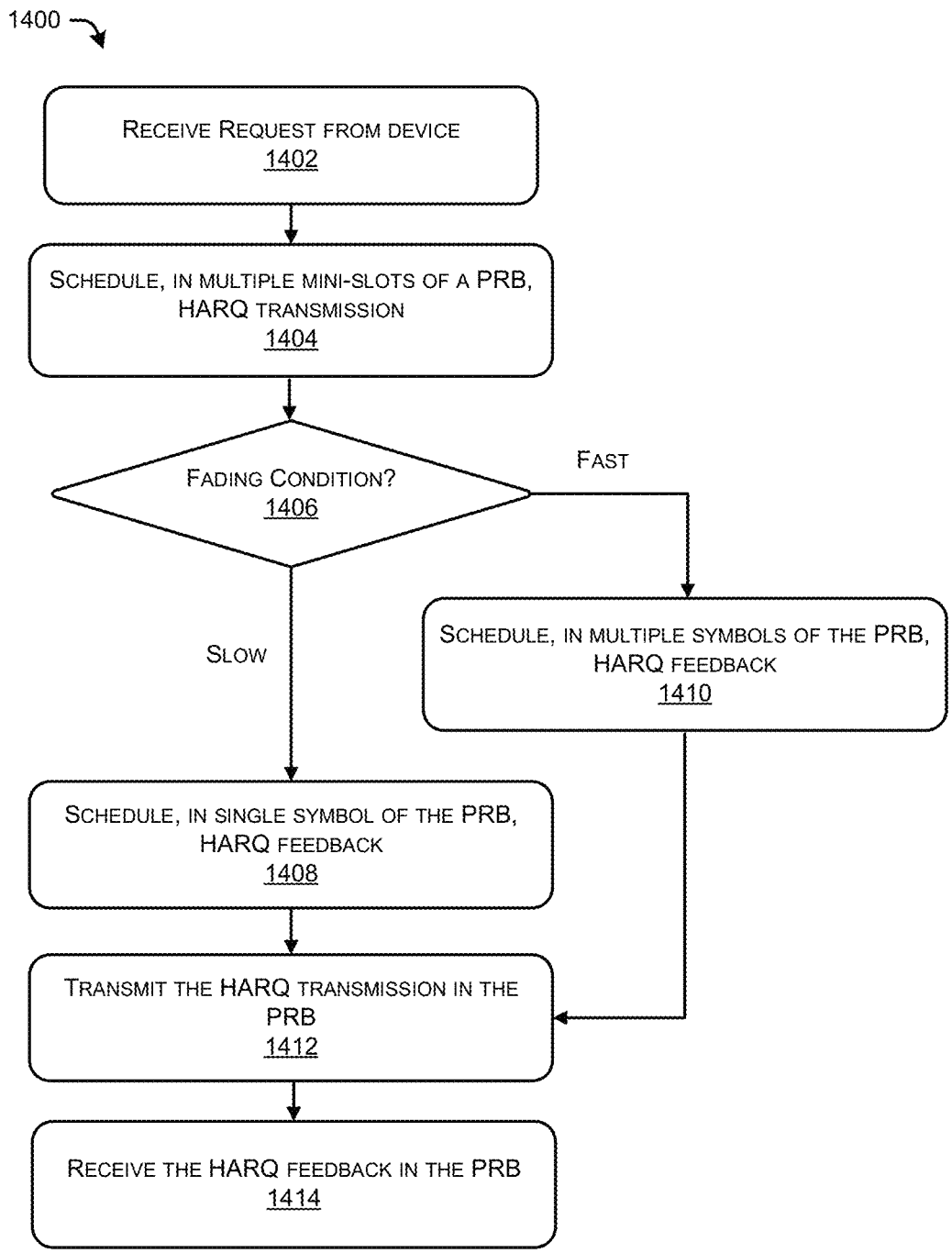
FIG. 14 illustrates a process for scheduling a HARQ transmission and HARQ feedback in the same PRB according to various embodiments.

FIG. 14 illustrates a process 1400 for scheduling a Hybrid Automatic Repeat reQuest (HARQ) transmission and HARQ feedback in the same Physical Resource Block (PRB) according to embodiments. The process 1400 may be performed by a base station, or a device controlling a base station, according to various embodiments.

At 1402, a request may be received from a device. In some instances, the request is received wirelessly from the device. The request may be a request for low-latency services, such as Ultra Reliable Low Latency Communication (URLLC) services, enhanced Mobile BroadBand (eMBB) services, etc. The device may be located in a cell region.

At 1404, a HARQ transmission is scheduled in multiple mini-slots of a PRB. In some implementations, any of the mini-slots may include one symbol, two symbols, four symbols, or seven symbols.

At 1406, a fading condition of the device is determined. For example, the fading condition may be determined to be a slow-fading condition or a fast-fading condition.

If the fading condition is determined to be a slow-fading condition, the process 1400 proceeds to 1408. At 1408, the HARQ feedback is scheduled in a single symbol of the PRB. The single symbol may be subsequent to the multiple mini-slots in which the HARQ transmission is scheduled. In some implementations, the single symbol may be a single feedback message indicating whether none of the mini-slots contain any uncorrectable errors, or whether at least one of the mini-slots contains at least one correctable error.

However, if the fading condition is determined to be a fast-fading condition, the process 1400 proceeds to 1410. At 1410, the HARQ feedback is scheduled in multiple symbols of the PRB. In some embodiments, the multiple symbols correspond respectively to the multiple mini-slots containing the HARQ transmission. For example, a first symbol may represent feedback from a portion of the HARQ transmission in the first mini-slot, and a second symbol may represent feedback from a portion of the HARQ transmission in the second mini-slot.

At 1412, the HARQ transmission is transmitted in the PRB. For example, the HARQ transmission can be transmitted wirelessly via a transmitter and/or a transceiver. The HARQ transmission may be transmitted to the device originating the request received at 1402.

At 1414, the HARQ feedback is received in the PRB. For example, the HARQ feedback may be received wirelessly via a receiver or a transceiver. The HARQ feedback may be received from the device originating the request received at 1402.

Scheduling HARQ Transmissions in Mini-Slots Based on Fading Conditions

In various embodiments, Hybrid Automatic Repeat reQuest (HARQ) transmission(s) and HARQ feedback message(s) are scheduled in mini-slots of the same Physical Resource Block (PRB). The mini-slots can be selected according to whether a device receiving the HARQ transmission(s) and transmitting the HARQ feedback message(s) is experiencing a fast-fading condition or a slow-fading condition.

Figure 15:
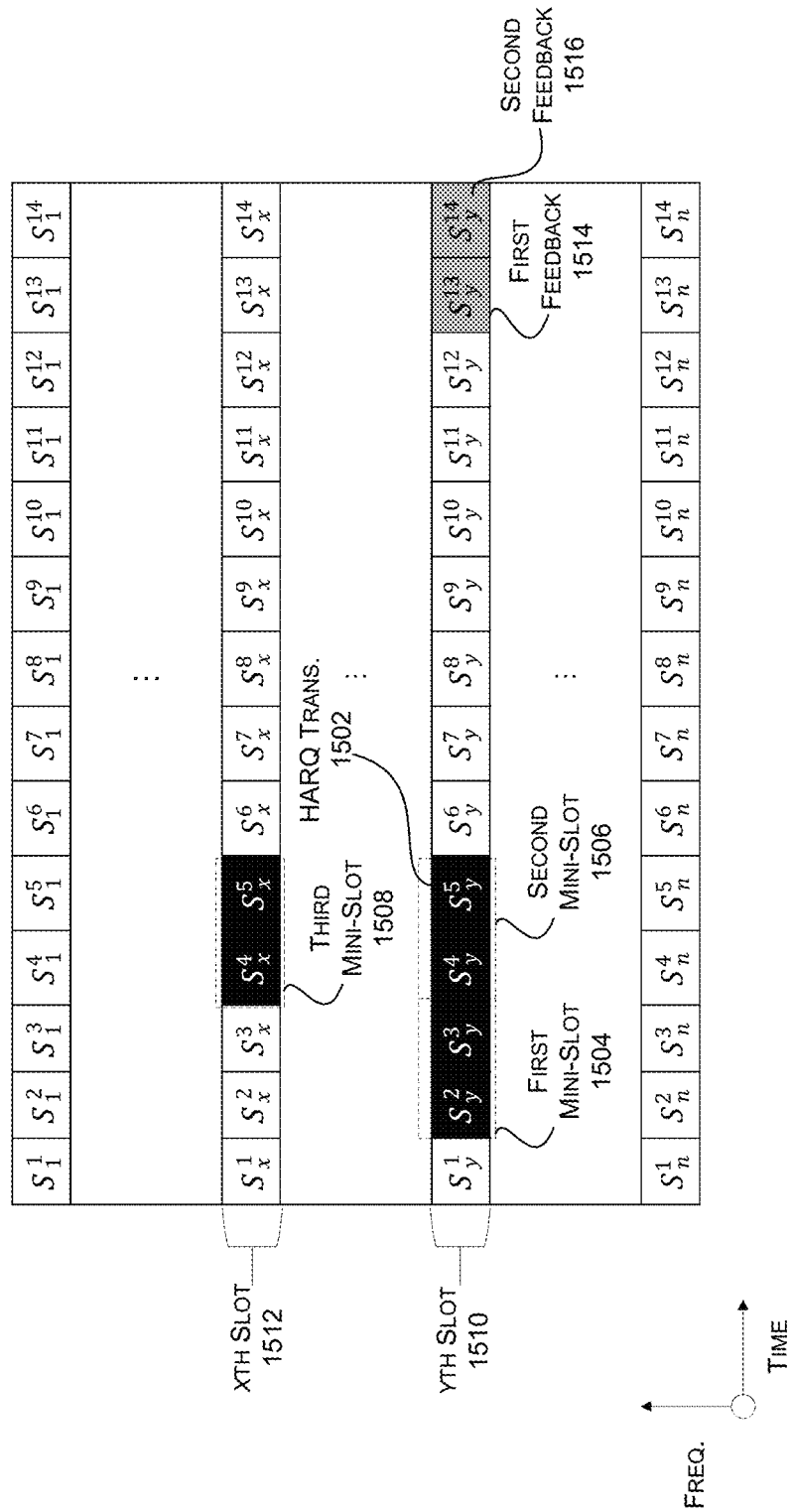
FIG. 15 illustrates an example of a scheduled PRB between a base station and a device experiencing a slow-fading condition according to various embodiments.

FIG. 15 illustrates an example of a scheduled Physical Resource Block (PRB) 1500 between a base station and a device experiencing a slow-fading condition. In some implementations, the PRB 1500 can be scheduled by the base station, a system controlling the base station, or another device. In some embodiments, the PRB 1500 includes downlink data transmitted by the base station and uplink data transmitted by the device.

As illustrated, the PRB 1500 includes a plurality of symbols arranged in a plurality of slots. The PRB 1500 can include n slots, where n can be a positive integer. In the example illustrated in FIG. 15, each of the n slots is illustrated as including 14 symbols. With reference to FIG. 15, the frequency dimension may be in a vertical direction, and the time dimension may be in a horizontal direction. The n slots may include an xth slot 1510 and a yth slot 1512, where x and y can be different positive integers and $1 \leq x \leq y \leq n$.

The PRB 1500 includes a HARQ transmission 1502 that is scheduled in multiple mini-slots 1504, 1506, and 1508 of the PRB 1500. The multiple mini-slots 1504, 1506, and 1508 may be part of a downlink channel, such as a Physical Downlink Control CHannel (PDCCH). As illustrated in FIG. 15, the HARQ transmission 1502 is scheduled in first, second, and third mini-slots 1504, 1506, and 1508. The first mini-slot 1504 can be scheduled in symbol(s) (e.g., symbols $S_y^2$ and $S_y^3$) that are in the yth slot 1512 and that are in a first time interval, the second mini-slot 1506 can be scheduled in symbol(s) (e.g., symbols $S_y^4$ and $S_y^5$) that are in the yth slot 1512 and that are in a second time interval, and the third mini-slot 1508 can be scheduled in symbol(s) that are in the xth slot 1510 and the second time interval (e.g., $S_x^4$ and $S_x^5$). The first and second time intervals may be different time intervals, and the xth and yth slots 1510 and 1512 may be defined in different frequency intervals.

In the slow-fading condition, portions of the scheduled HARQ transmission 1502 may overlap in the frequency domain and/or the time domain. For example, portions of the HARQ transmission 1502 may be scheduled in the first and second mini-slots 1504 and 1506, such that they are transmitted in the same frequency domain but at different time intervals. In some instances, portions of the HARQ transmission 1502 may be scheduled in the second mini-slot and third mini-slots 1506 and 1508, such that they are transmitted in the same time interval but in different frequencies.

The PRB 1500 also includes multiple HARQ feedback messages 1514 and 1516 scheduled in multiple symbols of the PRB 1500. In various embodiments, the multiple symbols are scheduled at times subsequent to the HARQ transmission 1502 (e.g., subsequent to the first, second, and third mini-slots 1504, 1506, and 1508). The multiple symbols may be part of an uplink channel. As illustrated in FIG. 15, first and second HARQ feedback messages 1514 and 1516 are scheduled in first and second symbols of the PRB 1500. In some instances, the first and second symbols are scheduled in the final or last symbols of one or more of the slots in the PRB 1500. For example, the first and second symbols are the final two symbols of the yth slot 1512.

The first HARQ feedback message 1514 may correspond to feedback from the device related to the first mini-slot 1504. For example, the first HARQ feedback message 1514 may include an acknowledgement (ACK) or a non-acknowledgement (NACK) from the device related to whether the device has detected an uncorrectable error in portion of the HARQ transmission 1502 in the first mini-slot 1504, in data bits transmitted during the first time interval, or both.

The second HARQ feedback message 1516 may correspond to feedback from the device related to the second mini-slot 1506 and/or the third mini-slot 1508. For example, the second HARQ feedback message 1516 may include an ACK or a NACK from the device related to whether the device has detected an uncorrectable error in the portion of the HARQ transmission 1502 in the second mini-slot 1506, in the portion of the HARQ transmission 1502 in the third mini-slot 1508, in data bits transmitted during the second time interval, or a combination thereof.

The PRB 1500 therefore contains a HARQ transmission and self-contained acknowledgement(s). In some embodiments, the PRB 1500 can contain data bits that are transmitted with high reliability due to the presence of the HARQ transmission and HARQ feedbacks. Furthermore, in some embodiments, the data bits can be transmitted with low latency since the HARQ transmission and the HARQ feedbacks are scheduled in the same PRB. In certain implementations, a computing resource of the device (e.g., the base station) scheduling the PRB 1500 can be conserved by scheduling the mini-slots in the same frequency and/or time domain.

Although FIG. 15 depicts that each of the mini-slots 1504, 1506, and 1508 has a width of two symbols, in some embodiments, one or more of the mini-slots 1504, 1506, and 1508 may have a size of one symbol, four symbols, seven symbols, or other sizes. Furthermore, although FIG. 15 depicts that each of the slots (e.g., first and second slots 1510 and 1512) includes fourteen symbols, in other embodiments, the slots can have a different number of symbols. According to some embodiments, the HARQ transmission can be scheduled in more than two mini-slots of the PRB 1500, or less than two mini-slots of the PRB 1500.

Any of the first mini-slot 1504, the second mini-slot 1506, and the third mini-slot 1508 may include symbols in multiple slots. For example, the first mini-slot 1504 may be defined as one or more symbols in a single slot (e.g., symbols $S_y^2$ and $S_y^3$ in the yth slot 1512) or may be defined as multiple symbols in one or more slots. In various embodiments, the first mini-slot 1504 has a width of a multiple symbols. For example, the first mini-slot 1504 may include one or more of symbols $S_1^2$ and $S_1^3$ through $S_n^2$ and $S_n^3$. According to various implementations, the HARQ retransmission 1502 may be scheduled in at least a portion of the first mini-slot 1504.

Figure 16:
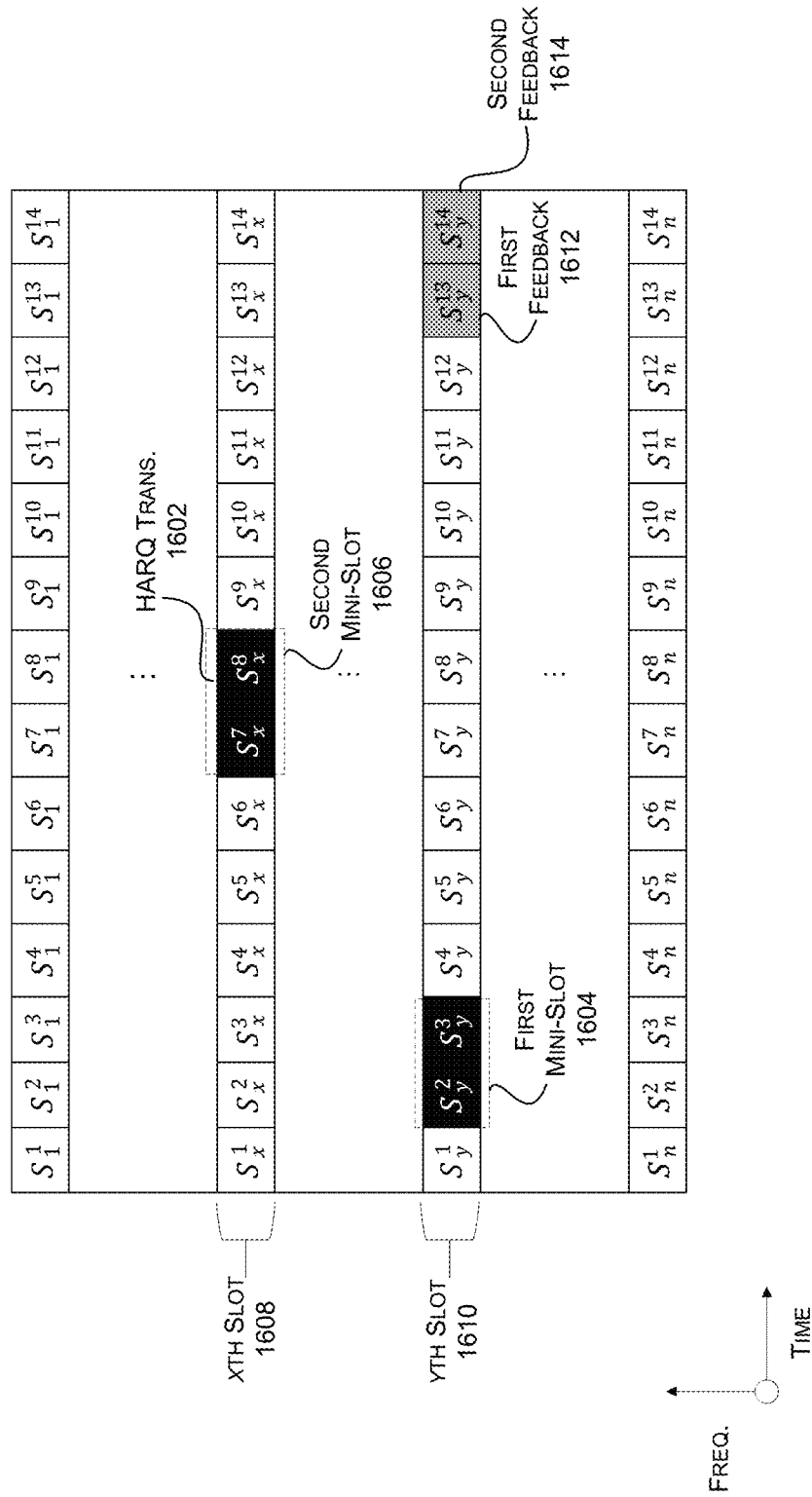
FIG. 16 illustrates an example of a scheduled PRB between a base station and a device experiencing a fast-fading condition according to various embodiments.

FIG. 16 illustrates an example of a scheduled Physical Resource Block (PRB) 1600 between a base station and a device experiencing a fast-fading condition. In some implementations, the PRB 1600 can be scheduled by the base station, a system controlling the base station, or another device. In some embodiments, the PRB 1600 includes downlink data transmitted by the base station and uplink data transmitted by the device.

As illustrated, the PRB 1600 includes a plurality of symbols arranged in a plurality of slots. The PRB 1600 can include n slots, where n can be a positive integer. In the example illustrated in FIG. 16, each of the n slots is illustrated as including 14 symbols. With reference to FIG. 16, the frequency dimension may be in a vertical direction, and the time dimension may be in a horizontal direction. The n slots may include an xth slot 1608 and a yth slot 1610, where x and y can be different positive integers and $1 \leq x \leq y \leq n$.

The PRB 1600 includes a Hybrid Automatic Repeat reQuest (HARQ) transmission 1602 that is scheduled in multiple mini-slots 1604 and 1606 of the PRB 1600. The multiple mini-slots 1604 and 1608 may be part of a downlink channel, such as a Physical Downlink Control CHannel (PDCCH). As illustrated in FIG. 16, the HARQ transmission 1602 is scheduled in first and second mini-slots 1604 and 1606. The first mini-slot 1604 is in symbol(s) ($S_y^2$ and $S_y^3$) that are in a yth slot 1610, which is defined by a first frequency interval, and that are in a first time interval. The second mini-slot 1606 is in symbol(s) ($S_x^7$ and $S_x^8$) that are in a xth slot 1608, which is defined by a second frequency interval, and that are in a second time interval. The yth slot 1610, the first frequency interval, and the first time interval may differ, respectively, from the xth slot 1608, the second frequency interval, and the second time interval.

In the fast-fading condition, the multiple mini-slots 1604 and 1606 may be staggered in the frequency domain and the time domain. For example, because the first mini-slot 1604 and the second mini-slot 1606 are scheduled in different slots, the first mini-slot 1604 and the second mini-slot 1606 may be staggered in the frequency domain. In addition, because the first mini-slot 1604 and the second mini-slot 1606 are scheduled in different time intervals, the first mini-slot 1604 and the second mini-slot 1606 may be staggered in the time domain.

The PRB 1600 also includes multiple HARQ feedback messages 1612 and 1614 scheduled in multiple symbols of the PRB 1600. In various embodiments, the multiple symbols are scheduled at times subsequent to the HARQ transmission 1602 (e.g., subsequent to the first and second mini-slots 1604 and 1606). The multiple symbols may be part of an uplink channel. As illustrated in FIG. 16, first and second HARQ feedback messages 1612 and 1614 are scheduled in first and second symbols of the PRB 1600. In some instances, the first and second symbols are scheduled in the final or last symbols of one or more of the slots in the PRB 1600. For example, the first and second symbols are the final two symbols of the first slot 1608.

The first HARQ feedback message 1612 may correspond to feedback from the device related to the first mini-slot 1604. For example, the first HARQ feedback message 1612 may include an acknowledgement (ACK) or a non-acknowledgement (NACK) from the device related to whether the device has detected an uncorrectable error in the portion of the HARQ transmission 1602 in the first mini-slot 1604, in data bits transmitted during the first time interval, or both.

The second HARQ feedback message 1614 may correspond to feedback from the device related to the second mini-slot 1606. For example, the second HARQ feedback message 1614 may include an ACK or a NACK from the device related to whether the device has detected an uncorrectable error in the portion of the HARQ transmission 1602 in the second mini-slot 1606, in data bits transmitted during the second time interval, or both.

The PRB 1600 therefore contains, in some examples, a HARQ transmission and self-contained acknowledgement(s). In some embodiments, the PRB 1600 can contain data bits that are transmitted with high reliability due to the presence of the HARQ transmission and HARQ feedbacks. Furthermore, in some embodiments, the data bits can be transmitted with low latency since the HARQ transmission and the HARQ feedbacks are scheduled in the same PRB. These advantages are possible, even in fast-fading conditions.

Although FIG. 16 depicts that each of the mini-slots 1604 and 1606 has a size of two symbols, in some embodiments, one or both of the mini-slots 1604 and 1606 may have a size of one symbol, four symbols, seven symbols, or another size. Moreover, although FIG. 16 depicts that each of the mini-slots 1604 and 1606 is constrained to a single slot, each of the mini-slots 1604 and 1606 can span multiple slots, in some embodiments. Furthermore, although FIG. 16 depicts that each of the slots (e.g., xth and yth slots 1608 and 1610) includes fourteen symbols, in other embodiments, the slots can have a different number of symbols.

Figure 17:
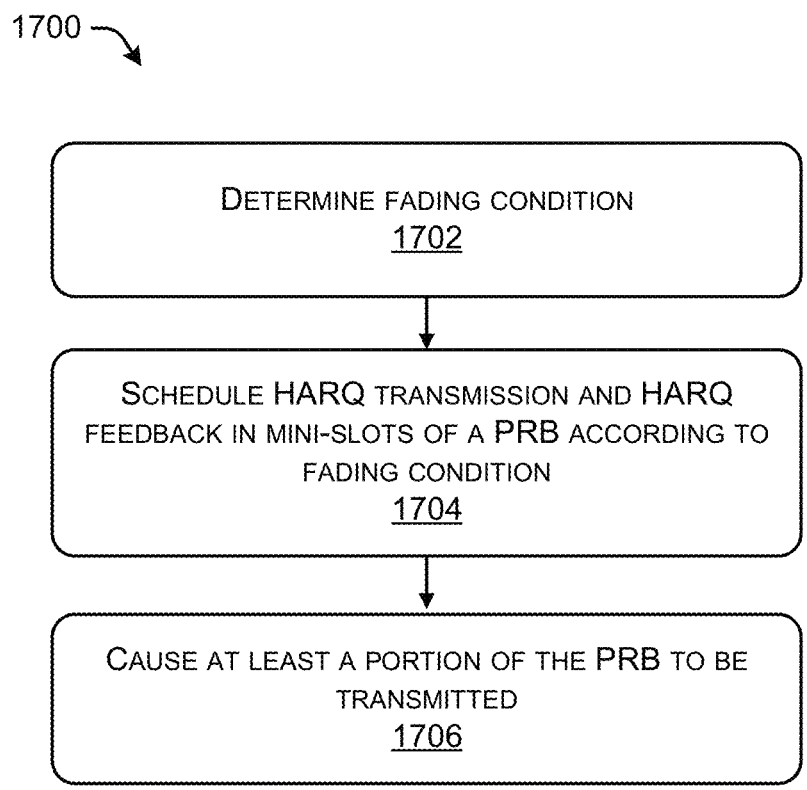
FIG. 17 illustrates an example process for scheduling a PRB based on a fading condition according to various embodiments.

FIG. 17 illustrates an example process 1700 for scheduling a Physical Resource Block (PRB) based on a fading condition according to embodiments of the present disclosure. Process 1700 can be performed by a base station or a device configured to control a base station, in some implementations.

At 1702, a fading condition is determined. The fading condition may be experienced by a device in a cell. In various embodiments, the fading condition may be identified as a slow-fading condition or a fast-fading condition. In some instances, a fading condition is identified by comparing, to a threshold, a historical variance of a phase, frequency, and/or amplitude of a wireless signal received from the device. For example, a slow-fading condition can be identified when the signal has a Doppler shift of more than a first predetermined level and less than a second predetermined level, and a fast-fading condition is identified when the Doppler shift is more than the first predetermined level and more than the second predetermined level.

In some instances, the fading condition is identified based on a geographical environment, frequency, and Doppler effects. The fading condition can be identified by path loss mode. For example, at least one factor can be identified, where the at least one factor can be one or more of a Bit Error Rate (BER), a Reference Signal Received Power (RSRP), a Signal to Noise Ratio (SNR), a Timing Advance (TA), feedback from the device, and the like. Based at least in part on the at least one factor, link adaptation can be utilized to adjust a Modulation Coding Scheme (MCS) of communications with the device. For example, a network can use a Radio Resource Management (RRM) algorithm based at least in part on the at least one factor. The network can also determine the fading condition according to the at least one factor, and whether the at least one factor satisfies at least one condition. Based on the fading condition, the network can also use the RRM algorithm to adjust the MCS.

At 1704, a Hybrid Automatic Repeat reQuest (HARQ) transmission and HARQ feedback messages are scheduled in mini-slots of a PRB according to the fading condition. In some examples, a HARQ transmission is scheduled in multiple mini-slots that overlap in the time and/or frequency domain when the fading condition is identified as a slow-fading condition. In certain examples, a HARQ transmission is scheduled in multiple mini-slots that are staggered in the time domain and the frequency domain when the fading condition is identified as a fast-fading condition. The HARQ feedback messages may be scheduled in symbols of the same PRB as the mini-slots. Accordingly, the PRB can include self-contained acknowledgements.

At 1706, the process 1700 may include causing at least a portion of the PRB to be transmitted. For example, an indication of the scheduled HARQ transmission and HARQ feedback messages can be transmitted to a device including a transmitter, which can transmit the PRB over wireless resources. In some instances, the PRB is transmitted by a base station.

Figure 18:
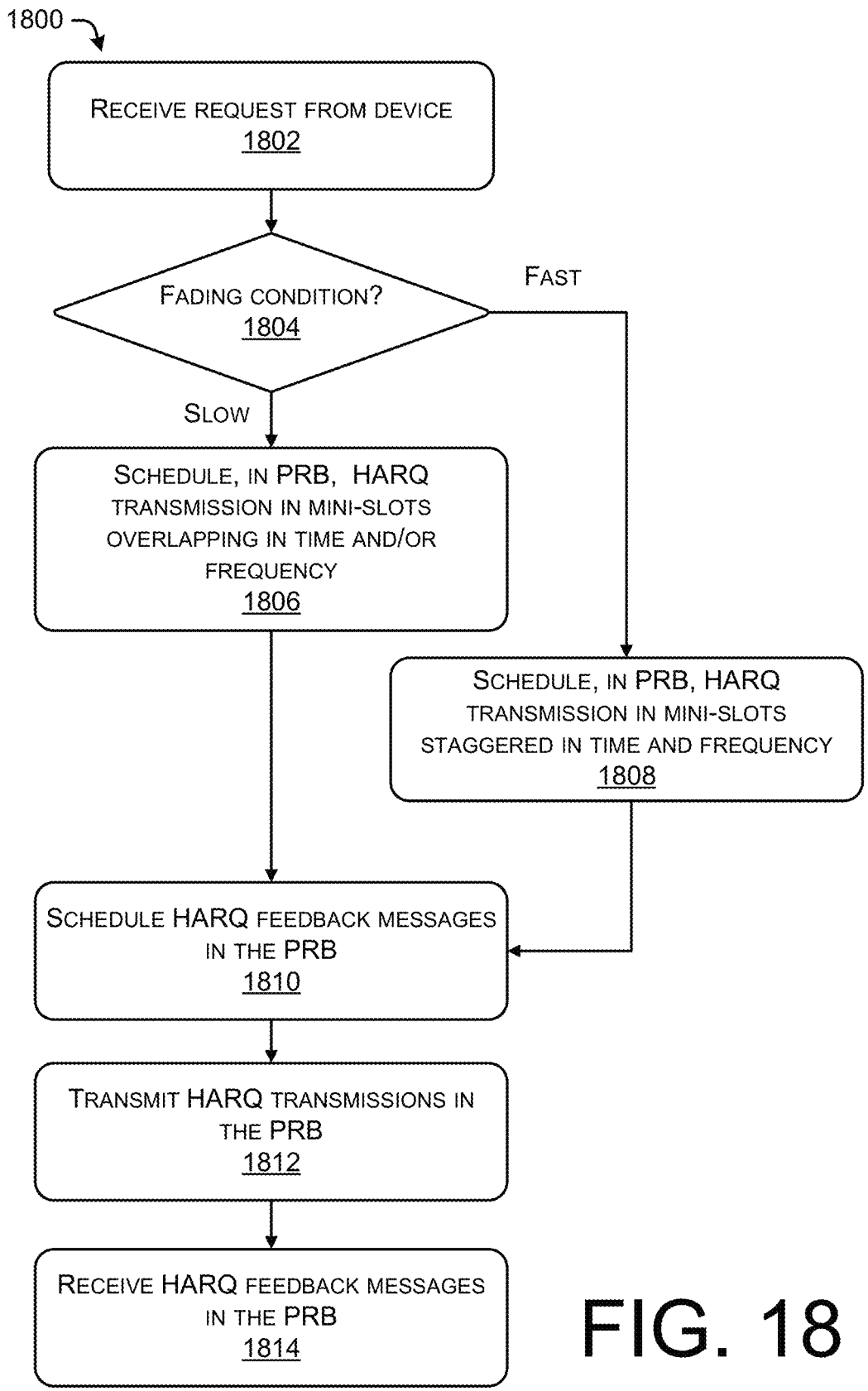
FIG. 18 illustrates an example process for scheduling, transmitting, and receiving a PRB based on a fading condition according to various embodiments.

FIG. 18 illustrates an example process 1800 for scheduling, transmitting, and receiving a Physical Resource Block (PRB) based on a fading condition according to embodiments of the present disclosure. Process 1800 can be performed by a base station or a device configured to control a base station, in some implementations.

At 1802, a request is received from a device. The request may be a request for a specific type of low-latency communications, such as Ultra Reliable Low Latency (URLLC) services, enhanced Mobile BroadBand (eMBB) services, and the like. The request may be received over a wireless link, in some embodiments. The device from which the request is received may be located in a cell area. In some embodiments, the device is at least one of a UE, an autonomous vehicle device, a remote surgery controller, or an industrial automation controller.

At 1804, a fading condition experienced by the device is determined. For example, the fading condition may be identified as a slow-fading condition or a fast-fading condition. In some instances, a fading condition is identified by comparing, to a threshold, a historical variance of a phase, frequency, and/or amplitude of a wireless signal received from the device. For example, a slow-fading condition can be identified when the signal has a Doppler shift of more than a first predetermined level and less than a second predetermined level, and a fast-fading condition is identified when the Doppler shift is more than the first predetermined level and more than the second predetermined level.

If the fading condition determined at 1804 is a slow-fading condition, the process 1800 continues to 1806. At 1806, a Hybrid Automatic Repeat reQuest (HARQ) transmission is scheduled in mini-slots of a Physical Resource Block (PRB) that overlap in the time domain and/or frequency domain. The HARQ transmissions may include one or more Error Correction Codes (ECCs) and one or more Error Detection (ED) codes. The mini-slots scheduled at 1806 may each include one or more symbols and may have different sizes. Each of the symbols may include multiple bits. In some instances, the mini-slots scheduled at 1806 include at least two mini-slots that are scheduled in different slots but in the same time interval. In some instances, the mini-slots scheduled at 1806 include at least two mini-slots that are scheduled in the same slot but at different time intervals.

If the fading condition determined at 1804 is a fast-fading condition, the process 1800 continues to 1808. At 1808, a HARQ transmission is scheduled in mini-slots of a PRB that are staggered in the time domain and the frequency domain. Similar to 1806, in 1808, the HARQ transmission may include one or more ECCs and one or more ED codes. The mini-slots scheduled at 1808 may each include one or more symbols and may have different sizes. Each of the symbols may include multiple bits. In some instances, the mini-slots scheduled at 1808 include at least two mini-slots that are scheduled in different slots and at different time intervals.

At 1810, HARQ feedback messages are scheduled in the PRB. The HARQ feedback messages may be scheduled at time intervals subsequent to at least one of the mini-slots in which the HARQ transmission is scheduled. In some embodiments, the HARQ feedback messages respectively correspond to the mini-slots scheduled at 1806 or 1808.

Although not illustrated in FIG. 18, the PRB may be further scheduled to include data bits. The data bits may represent the substantive communications being requested by the device. In a specific example, if the device is a remote surgery controller requesting control information that the device will use to control a surgical robot, the data bits may represent the control information.

At 1812, the HARQ transmissions scheduled in the PRB are transmitted. For example, the HARQ transmissions can be transmitted to the device originating the request. In some instances, data bits are also transmitted to the device in the PRB. The data bits may correspond to the communications requested from the device, e.g., low-latency communications.

At 1814, the HARQ feedback messages scheduled in the PRB are received. For example, the HARQ feedback messages are received from the device originating the request. In some instances, the HARQ feedback messages contain one or more bits indicating an acknowledgement (ACK) or a non-acknowledgement (NACK). Although not illustrated, a HARQ retransmission may be further transmitted to the device in response to the NACK.

Selecting Mini-Slots According to Conditions

In various embodiments, Hybrid Automatic Repeat reQuest (HARQ) transmission(s) and HARQ feedback(s) are scheduled in mini-slots of the same Physical Resource Block (PRB). The mini-slots can be sized according to at least one of a fading condition experienced by a device receiving the HARQ transmission(s) and transmitting the HARQ feedback(s), a location of the device, a type of services being provided to the device, or a Radio Frequency (RF) condition experienced by the device. In some cases, embodiments of the present disclosure can be applied in a Self-Organizing Network (SON). In some instances, mini-slots can be scheduled dynamically or according to pre-defined conditions. For example, the mini-slots can be scheduled dynamically when the RF condition is relatively poor.

Figure 19:
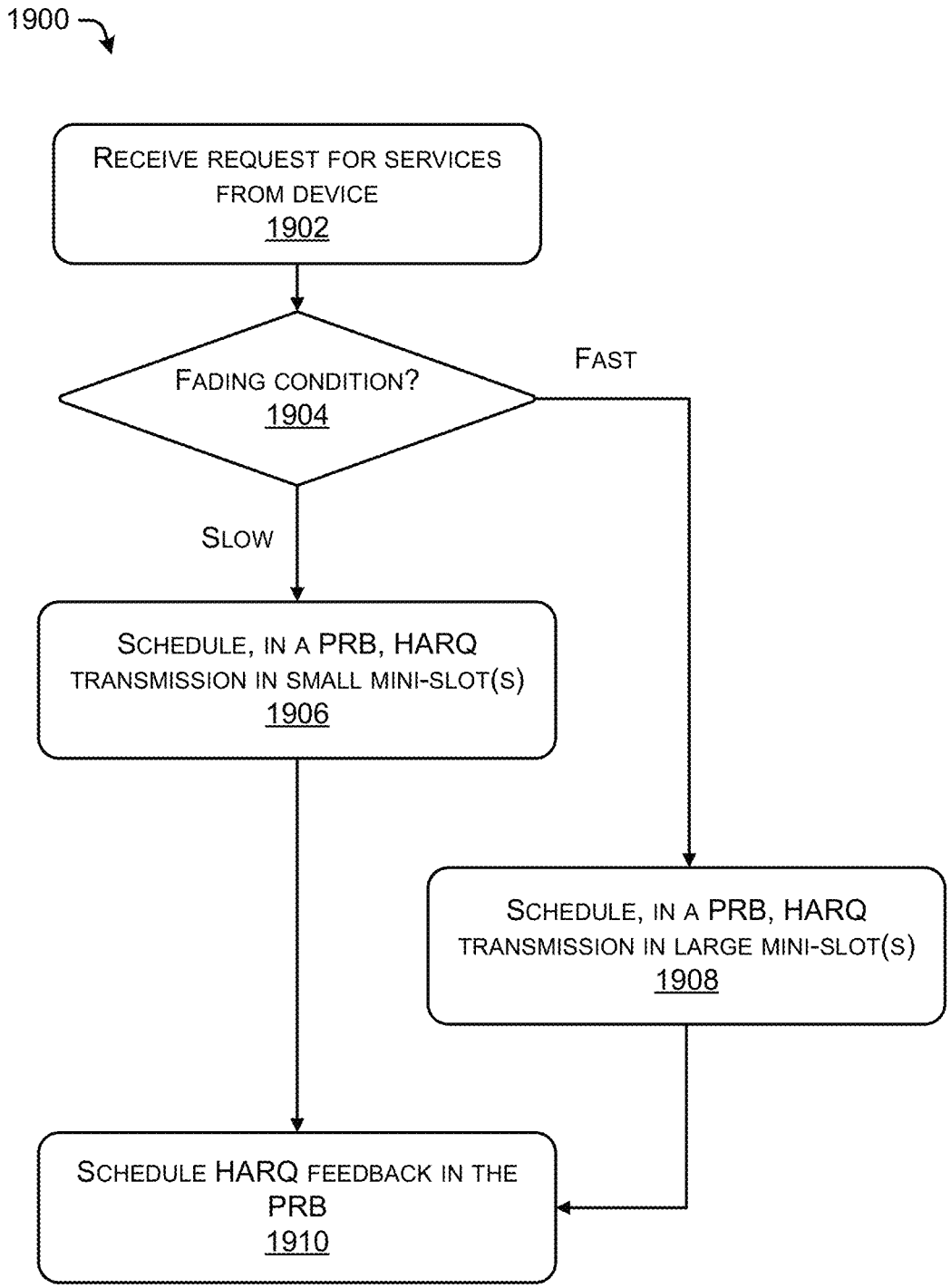
FIG. 19 illustrates an example process for selecting a mini-slot size according to a fading condition experienced by a device according to various embodiments.

FIG. 19 illustrates an example process 1900 for selecting a mini-slot size according to a fading condition experienced by a device according to embodiments. In various embodiments, process 1900 can be performed by a base station, by a device configured to control a base station, or some other device.

At 1902, a request for services is received from a device. In some embodiments, the request is for a type of low-latency services, such as Ultra Reliable Low-Latency (URLLC) services, enhanced Mobile BroadBand (eMBB) services, and the like. The device may be located in a cell region, for example.

At 1904, a fading condition is determined. The fading condition may be determined to be a slow-fading condition or a fast-fading condition. In various implementations, the fading condition is a fading condition experienced by the device. The fading condition may be determined, for example, from communications received from the device.

If the fading condition determined at 1904 is a slow-fading condition, the process 1900 proceeds to 1906. At 1906, a Hybrid Automatic Repeat reQuest (HARQ) transmission is scheduled in small mini-slot(s) of a Physical Resource Block (PRB).

If, on the other hand, the fading condition determined at 1904 is a fast-fading condition, the process 1900 proceeds to 1908. At 1908, a HARQ transmission is scheduled in large mini-slot(s) of a PRB.

As used with reference to FIG. 19, the terms "small" and "large" can be relative terms, rather than absolute terms. For example, in some implementations, a "small mini-slot" may have a "small" mini-slot size of 4 symbols, and a "large mini-slot" may have a "large" mini-slot size of 7 symbols. In some implementations, a "small mini-slot" may have a "small" mini-slot size of 1 symbol, and a "large mini-slot" may have a "large" mini-slot size of 2 symbols. According to various embodiments, a small mini-slot includes fewer symbols than a large mini-slot.

After 1906 or 1908, the process 1900 converges to 1910. At 1910, HARQ feedback is scheduled in the PRB. In various embodiments, the PRB includes both a HARQ transmission and HARQ feedback. The HARQ feedback may be, for example, a HARQ feedback message from the device, such as an acknowledgement (ACK) or a non-acknowledgement (NACK).

Figure 20:
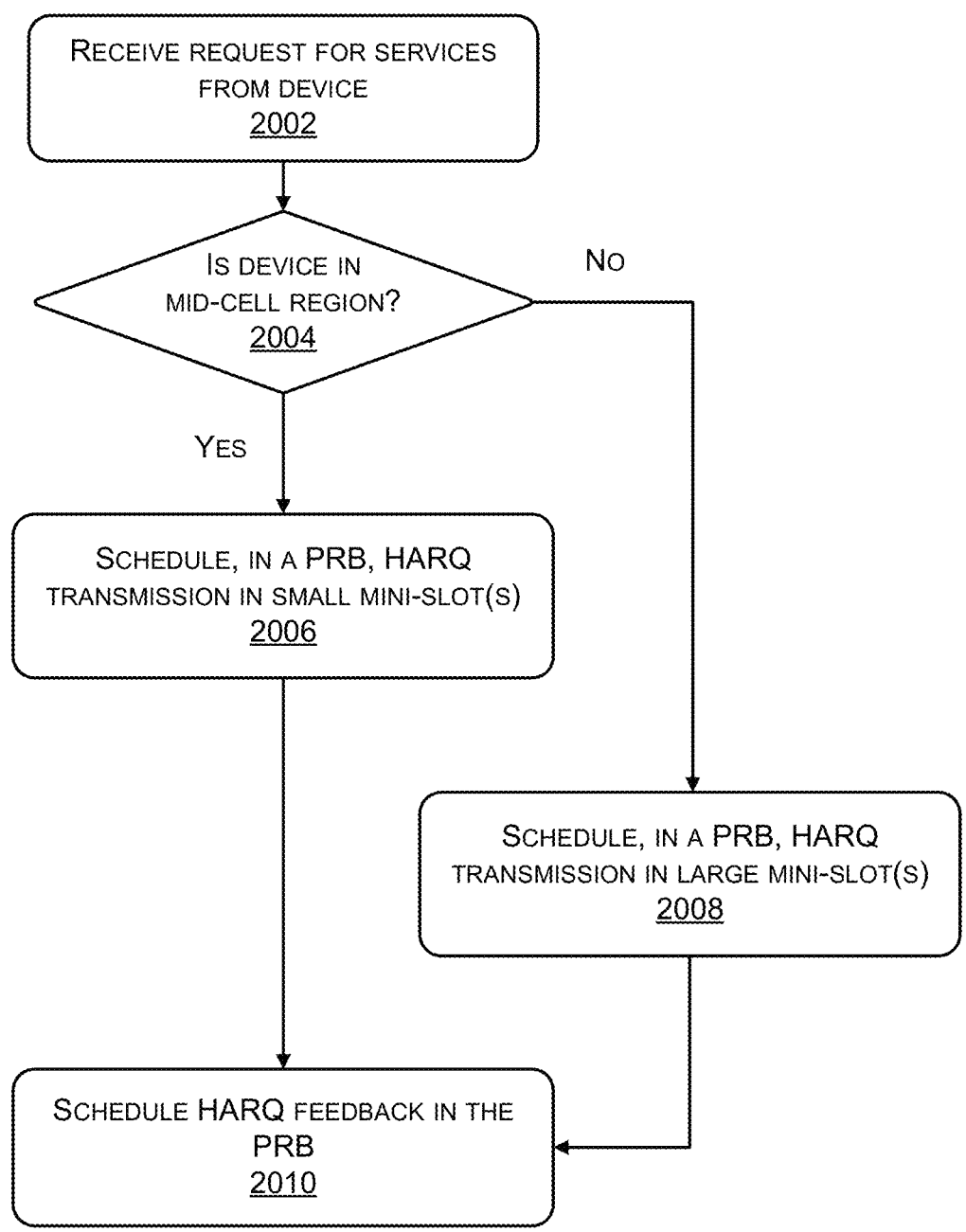
FIG. 20 illustrates an example process for selecting a mini-slot size based on a location of a device according to various embodiments.

FIG. 20 illustrates an example process 2000 for selecting a mini-slot size according to a location of a device. In various embodiments, process 2000 can be performed by a base station, by a device configured to control a base station, or some other device.

At 2002, a request for services is received from a device. In some embodiments, the request is for a type of low-latency services, such as Ultra Reliable Low-Latency (URLLC) services, enhanced Mobile BroadBand (eMBB) services, and the like. The device may be located in a cell region, for example.

At 2004, a location of the device is determined. Specifically, it can be determined whether the device is located in a mid-cell region. In some embodiments, the device can be determined to be located in a mid-cell region or a cell-edge region. A location of the device can be identified using any of various techniques, for example, Global Positioning System (GPS), signal quality, Round Trip Time (RTT) determinations, etc.

If device is determined to be in a mid-cell region, the process 2000 proceeds to 2006. At 2006, a Hybrid Automatic Repeat reQuest (HARQ) transmission is scheduled in small mini-slot(s) of a Physical Resource Block (PRB).

If, on the other hand, the device is not determined to be in a mid-cell region, the process 2000 proceeds to 2008. In some embodiments, the device is determined to be in a cell-edge region. At 2008, a HARQ transmission is scheduled in large mini-slot(s) of a PRB.

As used with reference to FIG. 20, the terms "small" and "large" can be relative terms, rather than absolute terms. For example, in some implementations, a "small mini-slot" may have a "small" mini-slot size of 4 symbols, and a "large mini-slot" may have a "large" mini-slot size of 7 symbols. In some implementations, a "small mini-slot" may have a "small" mini-slot size of 1 symbol, and a "large mini-slot" may have a "large" mini-slot size of 2 symbols. According to various embodiments, a small mini-slot includes fewer symbols than a large mini-slot.

After 2006 or 2008, the process 2000 converges to 2010. At 2010, HARQ feedback is scheduled in the PRB. In various embodiments, the PRB includes both a HARQ transmission and HARQ feedback. The HARQ feedback may be, for example, a HARQ feedback message from the device, such as an acknowledgement (ACK) or a non-acknowledgement (NACK).

Figure 21:
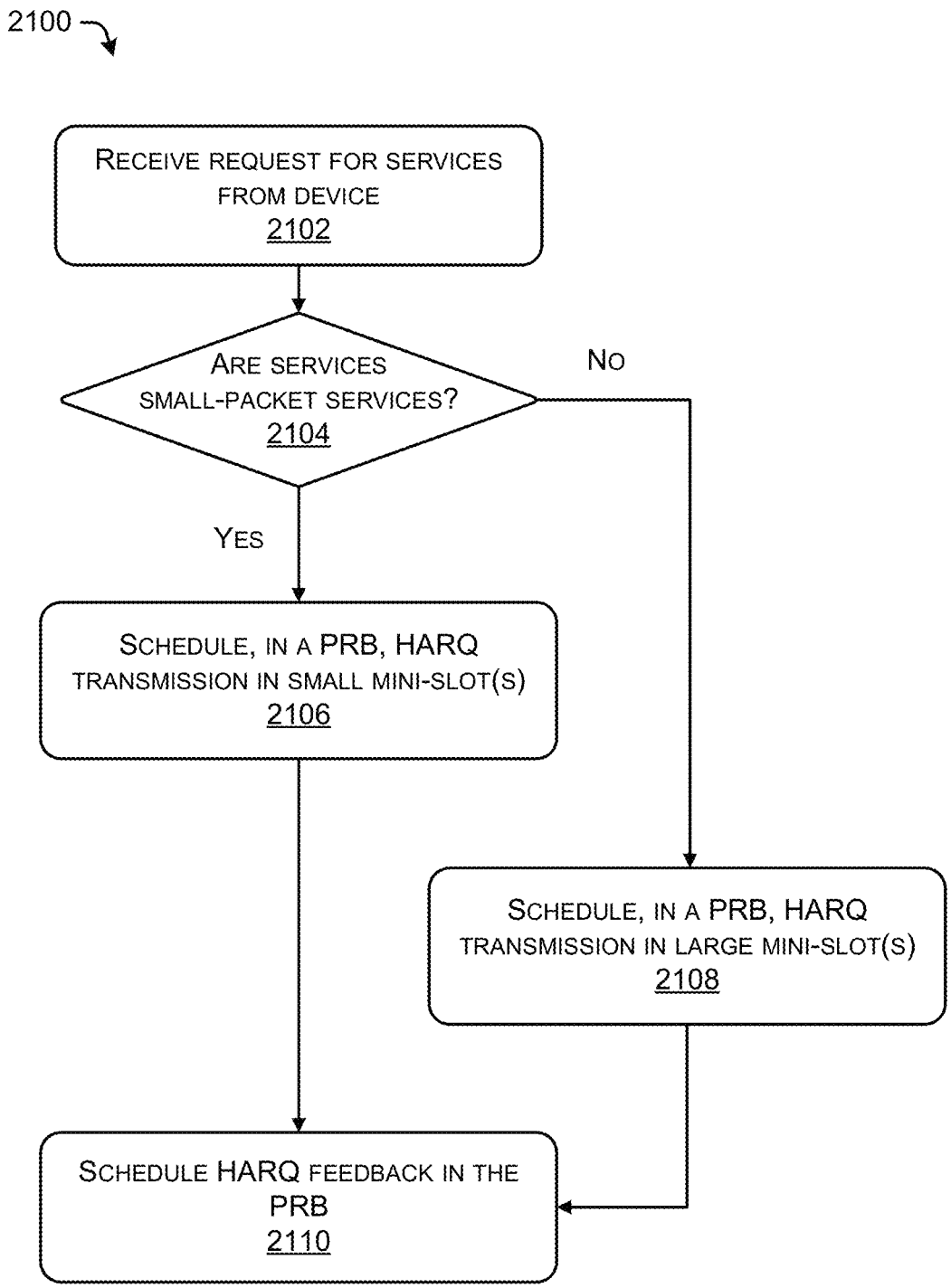
FIG. 21 illustrates an example process for selecting a mini-slot size based on a type of services being provided to a device according to various embodiments.

FIG. 21 illustrates an example process 2100 for selecting a mini-slot size according to a type of services being provided to a device. In various embodiments, process 2100 can be performed by a base station, by a device configured to control a base station, or some other device.

At 2102, a request for services is received from a device. In some embodiments, the request is for a type of low-latency services, such as Ultra Reliable Low-Latency (URLLC) services, enhanced Mobile BroadBand (eMBB) services, and the like. The device may be located in a cell region, for example.

At 2104, it is determined whether a type of the services is a small-packet type of services. In some implementations, one or more predetermined types of services are predefined as small-packet types of services. The small-packet types of services can include, for example, Augmented Reality (AR) services, Virtual Reality (VR) services, factory automation services, etc.

If the type of services requested by the device is a small-packet type of services, the process 2100 proceeds to 2106. At 2106, a Hybrid Automatic Repeat reQuest (HARQ) transmission is scheduled in small mini-slot(s) of a Physical Resource Block (PRB).

If, on the other hand, the services requested by the device are not small-packet services, the process 2100 proceeds to 2108. For example, the requested services may be services for controlling a self-driving car. At 2108, a HARQ transmission is scheduled in large mini-slot(s) of a PRB.

As used with reference to FIG. 21, the terms "small" and "large" can be relative terms, rather than absolute terms. For example, in some implementations, a "small mini-slot" may have a "small" mini-slot size of 4 symbols, and a "large mini-slot" may have a "large" mini-slot size of 7 symbols. In some implementations, a "small mini-slot" may have a "small" mini-slot size of 1 symbol, and a "large mini-slot" may have a "large" mini-slot size of 2 symbols. According to various embodiments, a small mini-slot includes fewer symbols than a large mini-slot.

After 2106 or 2108, the process 2100 converges to 2110. At 2110, HARQ feedback is scheduled in the PRB. In various embodiments, the PRB includes both a HARQ transmission and HARQ feedback. The HARQ feedback may be, for example, a HARQ feedback message from the device, such as an acknowledgement (ACK) or a non-acknowledgement (NACK).

Figure 22:
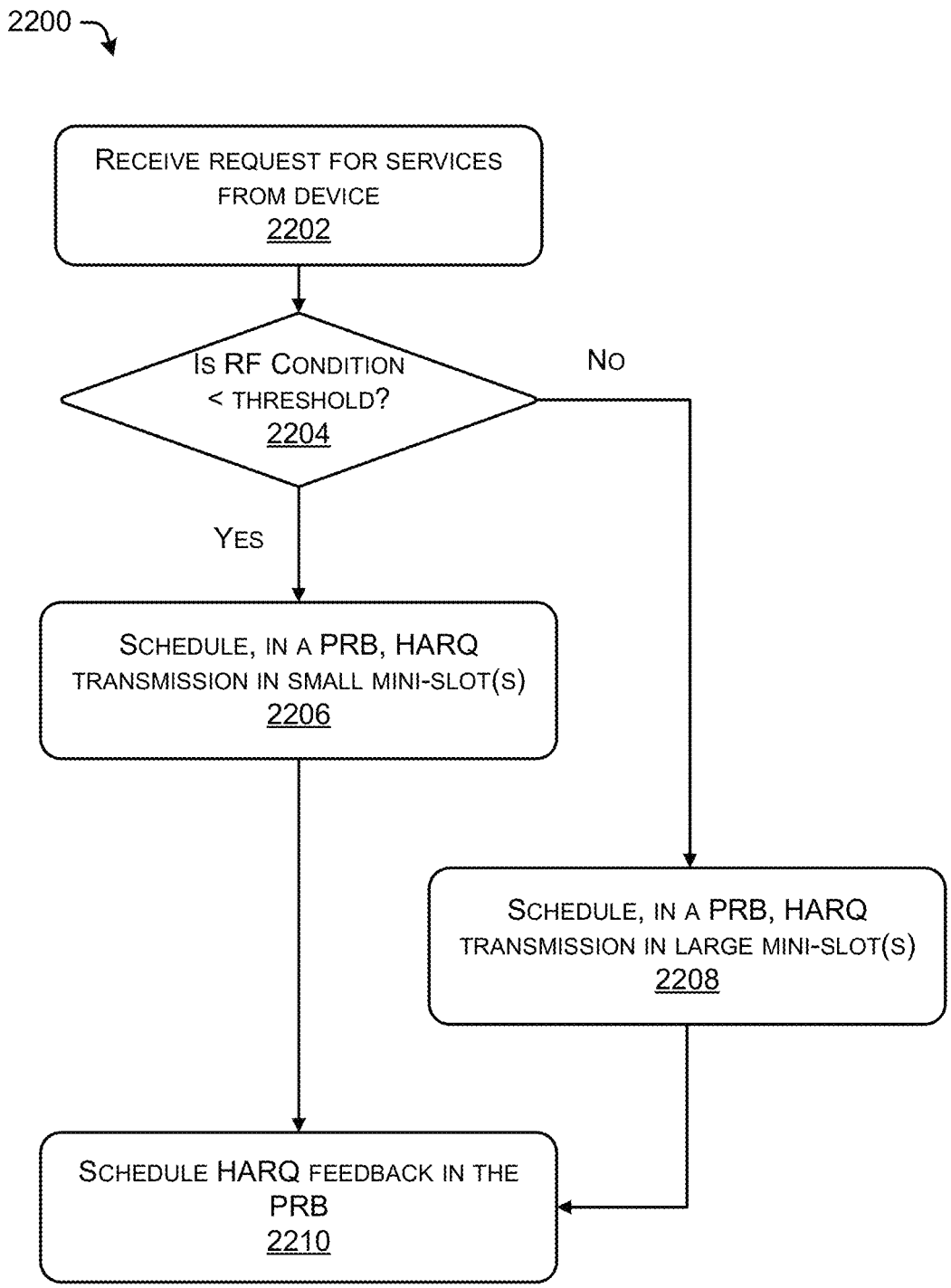
FIG. 22 illustrates an example process for selecting a mini-slot size based on a Radio Frequency (RF) condition experienced by a device according to various embodiments.

FIG. 22 illustrates an example process 2200 for selecting a mini-slot size according to a Radio Frequency (RF) condition experienced by a device. In various embodiments, process 2200 can be performed by a base station, by a device configured to control a base station, or some other device.

At 2102, a request for services is received from a device. In some embodiments, the request is for a type of low-latency services, such as Ultra Reliable Low-Latency Communication (URLLC) services, enhanced Mobile BroadBand (eMBB) services, and the like. The device may be located in a cell region, for example.

At 2204, it is determined whether an RF condition experienced by the device is less than a threshold. In various embodiments, the RF condition is a negative condition. For example, the RF condition may be a noise level, an attenuation level, etc. The RF condition can be determined based on a quality of a signal received by the device. In some implementations, the signal is the request for services. The threshold may be a predetermined threshold. In some implementations, the threshold can be dynamically defined.

If the RF condition is determined to be less than the threshold, the process 2200 proceeds to 2206. At 2206, a Hybrid Automatic Repeat reQuest (HARQ) transmission is scheduled in small mini-slot(s) of a Physical Resource Block (PRB).

If, on the other hand, the RF condition is greater than the threshold, the process 2200 proceeds to 2208. For example, the device may be located in a region with relatively poor wireless coverage. At 2208, a HARQ transmission is scheduled in large mini-slot(s) of a PRB.

As used with reference to FIG. 22, the terms "small" and "large" can be relative terms, rather than absolute terms. For example, in some implementations, a "small mini-slot" may have a "small" mini-slot size of 4 symbols, and a "large mini-slot" may have a "large" mini-slot size of 7 symbols. In some implementations, a "small mini-slot" may have a "small" mini-slot size of 1 symbol, and a "large mini-slot" may have a "large" mini-slot size of 2 symbols. According to various embodiments, a small mini-slot includes fewer symbols than a large mini-slot.

After 2206 or 2208, the process 2200 converges to 2210. At 2210, HARQ feedback is scheduled in the PRB. In various embodiments, the PRB includes both a HARQ transmission and HARQ feedback. The HARQ feedback may be, for example, a HARQ feedback message from the device, such as an acknowledgement (ACK) or a non-acknowledgement (NACK).

According to various embodiments, one or more of the processes 1900, 2000, 2100, and 2200 described above can be used to dynamically schedule and/or assign mini-slot(s) in a PRB. For example, any of the processes 1900, 2000, 2100, and 2200 can be utilized to select a mini-slot size, schedule a HARQ transmission in a mini-slot of a PRB having the mini-slot size, and schedule HARQ feedback in the PRB. For example, the processes 1900, 2000, 2100, and 2200 may be combined to select a mini-slot size according to one or more criteria specified in the processes 1900, 2000, 2100, and 2200, e.g., as part of a dynamic scheduling algorithm. In some embodiments, the PRB can be transmitted and received over wireless resources. For example, the HARQ transmission can be transmitted to a device, and the HARQ feedback can be received from the device, in accordance with the scheduled PRB.

Figure 23:
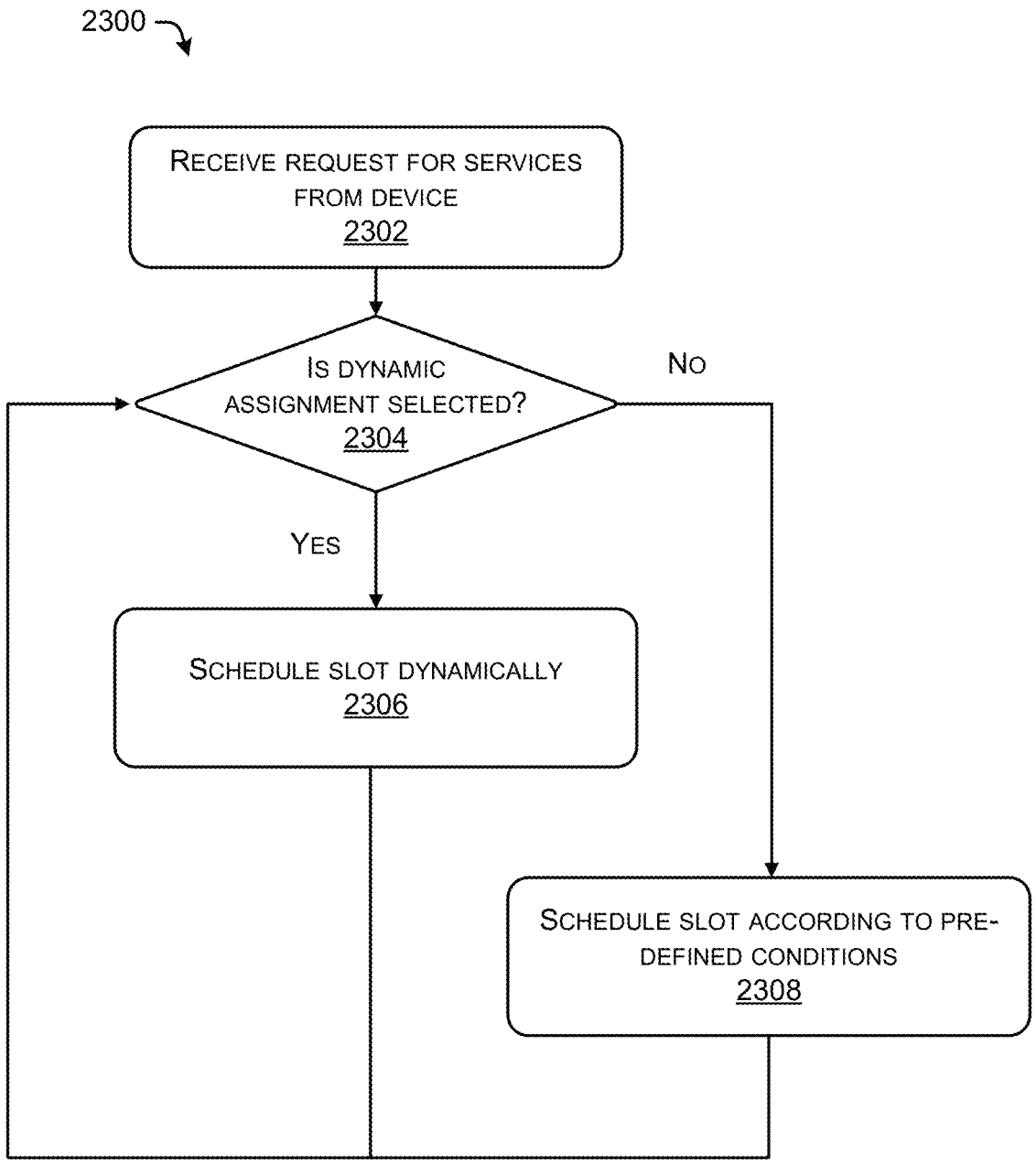
FIG. 23 illustrates a process of assigning a slot transmission dynamically and/or in a predefined manner according to various embodiments.

FIG. 23 illustrates a process 2300 of assigning a slot transmission dynamically and/or in a predefined manner according to various embodiments. Process 2300 can be performed by one or more network elements capable of performing pre-defined and dynamic assignment. For example, process 2300 can be performed by a base station.

At 2302, a request for services is received from a device. In some embodiments, the request is for a type of low-latency services, such as Ultra Reliable Low-Latency (URLLC) services. The device may be located in a cell region, for example.

At 2304, it may be determined whether dynamic assignment is selected. In some instances, dynamic assignment is selected under one or more conditions, such as when a Radio Frequency (RF) condition experienced by the device is relatively poor (e.g., based on how an observed RF condition compares to a predetermined threshold). In certain instances, the dynamic assignment is selected based on any of a Round Trip Delay (RTD) of messages exchanged with the device, a Self-Organizing Network (SON) factor, or a network topology factor.

If dynamic assignment is determined to be selected at 2304, the process 2300 continues to 2306. At 2306, a slot is scheduled dynamically. In various instances, a size and/or arrangement of mini-slots (e.g., mini-slots containing Hybrid Automatic Repeat reQuest (HARQ) transmissions, HARQ retransmissions, and the like) in the slot are selected based on observed conditions, which can vary over time. For example, a mini-slot size is selected dynamically based on at least one of an observed fading condition (e.g., according to process 1900 of FIG. 19), an observed location of the device (e.g., according to process 2000 of FIG. 20), a type of services being requested by the device (e.g., according to process 2100 of FIG. 21), a Radio Frequency (RF) condition experienced by the device (e.g., according to process 2200 of FIG. 22), and the like. In some embodiments, the slot may be scheduled in various manners according to various factors, such as any of selecting a number of symbols in a mini-slot (e.g., as described above with reference to any of FIGS. 11, 13, 14, and 19-22), selecting whether to transmit transmissions/feedback messages/retransmissions in multiple mini-slots the same Physical Resource Block (PRB) (e.g., as described above with reference to any of FIGS. 7-10 and 12), selecting whether to schedule overlapping mini-slots (e.g., as described above with reference to FIGS. 14-18), and the like.

If, however, dynamic assignment is determined to not be selected at 2304, the process 2300 proceeds to 2308. At 2308, a slot is scheduled according to pre-defined conditions. The pre-defined conditions may be set in advance according to at least one of the RTD, the SON factor, or the network topology factor. In various instances, a size and/or arrangement of mini-slots (e.g., mini-slots containing Hybrid HARQ transmissions, HARQ retransmissions, and the like) in the slot are selected in advance, regardless of observed network conditions. In some instances, the pre-defined conditions include at least one of selecting a number of symbols in a mini-slot, selecting whether to transmit transmissions/feedback messages/retransmissions in multiple mini-slots the same PRB, selecting whether to schedule overlapping mini-slots, and the like.

In various instances, process 2300 can be used to schedule relatively short packets with relatively high priority (e.g., URLLC packets). In some instances, URLLC packets can puncture some wireless resources associated with lower priority, e.g., enhanced Mobile BroadBand (eMBB) resources, using the mini-slot format.

EXAMPLE CLAUSES

A: A system comprising: one or more processors; a memory; and one or more components stored in the memory and executable by the one or more processors to perform operations comprising: determining whether one or more conditions of a device satisfy one or more criteria; selecting, based at least in part on whether the one or more conditions of the device satisfy the one or more criteria, a mini-slot size; scheduling, in one or more mini-slots having the mini-slot size in a Physical Resource Block (PRB), a Hybrid Automatic Repeat Request (HARQ) transmission; and transmitting, to the device, the HARQ transmission in the one or more mini-slots of the PRB.

B: The system of paragraph A, wherein determining whether the one or more conditions of the device satisfy the one or more criteria comprises determining that a Radio Frequency (RF) condition of the device is less than a threshold, and wherein selecting the mini-slot size comprises selecting a single-symbol mini-slot size.

C: The system of paragraph B, wherein determining whether the one or more conditions of the device satisfy the one or more criteria further comprises: determining a location of the device is in a mid-cell region; and determining the device is requesting small-packet services.

D: The system of any of paragraphs A-C, wherein determining whether the one or more conditions of the device satisfies one or more criteria comprises determining that the device is requesting Ultra Reliable Low Latency Communication (URLLC) services, and wherein selecting the mini-slot size comprises selecting a single-symbol mini-slot size.

E: The system of any of paragraphs A-D, the one or more mini-slots being one or more first mini-slots, wherein the operations further comprise: scheduling, in one or more first symbols of the PRB, a HARQ feedback message of the HARQ transmission.

F: The system of paragraph E, wherein the operations further comprise: receiving, from the device, the first HARQ feedback message in the one or more first symbols of the PRB.

G: The system of any of paragraphs A-F, wherein determining whether the one or more conditions of the device satisfy the one or more criteria comprises determining that the device is requesting small-packet services, and wherein selecting the mini-slot size comprises selecting a single-symbol mini-slot size.

H: The system of any of paragraphs A-G, wherein determining whether the one or more conditions of the device satisfy the one or more criteria comprises determining that at least one of a Radio Frequency (RF) condition of the device is greater than a threshold and the device is requesting large-packet services, and wherein selecting the mini-slot size comprises selecting a multiple-symbol mini-slot size.

I: The system of any of paragraphs A-H, wherein determining whether the one or more conditions of the device satisfy the one or more criteria comprises: determining whether a Radio Frequency (RF) condition of the device is less than a threshold; and determining whether the device is requesting small-packet services, wherein selecting the mini-slot size comprises: in response to determining the RF condition of the device is less than the threshold and determining that the device is requesting small-packet services, selecting a first mini-slot size; in response to determining the RF condition of the device is less than the threshold and determining that the device is requesting large-packet services, selecting a second mini-slot size; and in response to determining that the RF condition of the device is greater than the threshold and determining that the device is requesting large-packet services, selecting a third mini-slot size, wherein the first mini-slot size is smaller than the second mini-slot size, and the second mini-slot size is smaller than the third mini-slot size.

J: A method comprising: detecting one or more conditions of a device; selecting, based at least in part on the one or more conditions of the device, a mini-slot size; scheduling, in one or more mini-slots having the mini-slot size in a Physical Resource Block (PRB), a Hybrid Automatic Repeat Request (HARQ) transmission; and transmitting, to the device, the HARQ transmission in the one or more mini-slots of the PRB.

K: The method of paragraph J, wherein detecting the one or more conditions of the device comprises determining that the device is requesting Ultra Reliable Low Latency Communication (URLLC) services.

L: The method of paragraph J or K, wherein detecting the one or more conditions of the device comprises at least one of: detecting whether a fading condition of the device is a slow-fading condition; detecting whether the device is located in a mid-cell region; detecting whether the device is requesting small-packet services; and detecting whether a Radio Frequency (RF) condition of the device is less than a threshold.

M: The method of paragraph L, wherein detecting the one or more conditions of the device comprises: detecting that the device is requesting small-packet services; and detecting that the RF condition of the device is less than the threshold, and wherein selecting, based at least in part on the one or more conditions of the device, the mini-slot size comprises selecting a single-symbol mini-slot size.

N: The method of paragraph L or M, wherein selecting, based at least in part on the one or more conditions of the device, the mini-slot size comprises: in response to detecting that the device is requesting large-packet services or that the RF condition of the device is greater than the threshold, selecting a first multiple-symbol mini-slot size.

O: The method of paragraph N, wherein selecting, based at least in part on the one or more conditions of the device, the mini-slot size comprises: in response to detecting that the device is requesting large-packet services and that the RF condition of the device is greater than the threshold, selecting a second multiple-symbol mini-slot size, and wherein the first multiple-symbol mini-slot size is smaller than the second multiple-symbol mini-slot size.

P: The method of any of paragraphs J-O, further comprising: scheduling, in one or more symbols of the PRB, at least one HARQ feedback message; and receiving, in the one or more symbols of the PRB from the device, the at least one HARQ feedback message.

Q: A method comprising: receiving, from a device, a request for services; determining a Radio Frequency (RF) condition of the device is less than a threshold; determining whether the request is for small-packet services; selecting, based on whether the request is for small-packet services, a mini-slot size; scheduling, in one or more mini-slots having the mini-slot size in a Physical Resource Block (PRB), a Hybrid Automatic Repeat Request (HARQ) transmission; and transmitting, to the device, the HARQ transmission in the one or more mini-slots of the PRB.

R: The method of paragraph Q, wherein the request is for Ultra Reliable Low Latency Communication (URLLC) services.

S: The method of paragraph Q or R, wherein selecting the mini-slot size comprises: in response to determining that the request is for small-packet services, selecting a single-symbol mini-slot size.

T: The method of any of paragraphs Q-S, wherein selecting the mini-slot size further comprises: in response to determining that the request is for large-packet services, selecting a multiple-symbol mini-slot size.

U: A system comprising: one or more processors; a memory; and one or more components stored in the memory and executable by the one or more processors to perform operations comprising: determining a location of a device; selecting, based at least in part on the location of the device, a mini-slot size; scheduling, in one or more mini-slots having the mini-slot size in a Physical Resource Block (PRB), a Hybrid Automatic Repeat Request (HARQ) transmission; and transmitting, to the device, the HARQ transmission in the one or more mini-slots of the PRB.

V: The system of paragraph U, wherein determining the location of the device comprises determining that the device is in a cell-edge region or a mid-cell region.

W: The system of paragraph V, wherein selecting, based at least in part on the location of the device, the mini-slot size comprises: in response to determining that the device in the cell-edge region, selecting a multiple-symbol size as the mini-slot size.

X: The system of paragraph V or W, wherein selecting, based at least in part on the location of the device, the mini-slot size comprises: in response to determining that the device in the mid-cell region, selecting a single-symbol size as the mini-slot size.

Y: The system of any of paragraphs U-X, the one or more mini-slots being one or more first mini-slots, wherein the operations further comprise: scheduling, in one or more first symbols of the PRB to be subsequent to the one or more first mini-slots, a first HARQ feedback message of the HARQ transmission; scheduling, in one or more second mini-slots of the PRB, a HARQ retransmission; and scheduling, in one or more second symbols of the PRB to be subsequent to the one or more second mini-slots, a second HARQ feedback message of the HARQ retransmission.

Z: The system of paragraph Y, wherein the operations further comprise: receiving, from the device, the first HARQ feedback message in the one or more first symbols of the PRB; transmitting, to the device, the HARQ retransmission in the one or more second mini-slots of the PRB; and receiving, from the device, the second HARQ feedback message in the one or more second symbols of the PRB.

AA: The system of paragraph Y or Z, wherein the one or more first symbols are scheduled to be received subsequent to completion of a first device processing time and a first alignment time, the first device processing time and the first alignment time to be in a time interval between the one or more first mini-slots and the one or more first symbols, wherein the one or more second mini-slots are scheduled to be transmitted subsequent to completion of a base station processing time, the base station processing time to be in a time interval between the one or more first symbols and the one or more second mini-slots, and wherein the one or more second symbols are scheduled to be received subsequent to completion of a second device processing time and a second alignment time, the second device processing time and the second alignment time to be in a time interval between the one or more second mini-slots and the one or more second symbols.

AB: The system of any of paragraphs U-AA, wherein scheduling the HARQ transmission comprises scheduling the HARQ transmission in multiple mini-slots of the PRB, and wherein the operations further comprise scheduling a HARQ feedback message in a single symbol of the PRB.

AC: The system of paragraph AB, wherein the single symbol is a final symbol of a particular slot in the PRB.

AD: A method comprising: determining a location of a device; selecting, based at least in part on the location of the device, a mini-slot size; scheduling, in one or more mini-slots having the mini-slot size in a Physical Resource Block (PRB), a Hybrid Automatic Repeat Request (HARQ) transmission; and transmitting, to the device, the HARQ transmission in the one or more mini-slots of the PRB.

AE: The method of paragraph AD, wherein determining the location of the device comprises determining that the device is in a cell-edge region or a mid-cell region.

AF: The method of paragraph AE, wherein selecting, based at least in part on the location of the device, the mini-slot size comprises: in response to determining that the device in the cell-edge region, selecting a multiple-symbol size as the mini-slot size.

AG: The method of paragraph AE or AF, wherein selecting, based at least in part on the location of the device, the mini-slot size comprises: in response to determining the device in the mid-cell region, selecting a single-symbol size as the mini-slot size.

AH: The method of any of paragraphs AD-AG, the one or more mini-slots being one or more first mini-slots, the method further comprising: scheduling, in one or more first symbols of the PRB, a first HARQ feedback message of the HARQ transmission; scheduling, in one or more second mini-slots of the PRB, a HARQ retransmission; and scheduling, in one or more second symbols of the PRB, a second HARQ feedback message of the HARQ retransmission.

AI: The method of paragraph AH, further comprising: receiving, from the device, the first HARQ feedback message in the one or more first symbols of the PRB; transmitting, to the device, the HARQ retransmission in the one or more second mini-slots of the PRB; and receiving, from the device, the second HARQ feedback message in the one or more second symbols of the PRB.

AJ: The method of paragraph AH or AI, wherein the one or more first symbols are scheduled to be received subsequent to completion of a first device processing time and a first alignment time, wherein the one or more second mini-slots are scheduled to be transmitted subsequent to completion of a base station processing time, and wherein the one or more second symbols are scheduled to be received subsequent to completion of a second device processing time and a second alignment time.

AK: The method of any of paragraphs AD-AJ, wherein scheduling the HARQ transmission comprises scheduling the HARQ transmission in multiple mini-slots of the PRB, and wherein the method further comprises scheduling a HARQ feedback message in a single symbol of the PRB.

AL: The method of paragraph AK, wherein the single symbol is a final symbol of a particular slot in the PRB.

AM: A non-transitory computer-readable medium storing one or more components that, when executed by one or more processors, cause the one or more processors to perform operations comprising: determining that a device is located in a mid-cell region; scheduling, in a first single-symbol mini-slot in a Physical Resource Block (PRB), a Hybrid Automatic Repeat Request (HARQ) transmission; scheduling, in a second single-symbol mini-slot in the PRB, a HARQ retransmission; scheduling, in multiple symbols of the PRB, data bits; and transmitting, to the device, the HARQ transmission in the first single-symbol mini-slot, the HARQ retransmission in the second single-symbol mini-slot, and the data bits in the multiple symbols.

AN: The non-transitory computer-readable medium of paragraph AM, wherein the operations further comprise: scheduling, in a single symbol of the PRB, a HARQ feedback message corresponding to the HARQ transmission and the HARQ retransmission.

AO: A system comprising: one or more processors; a memory; and one or more components stored in the memory and executable by the one or more processors to perform operations comprising: detecting a fading condition of a device; scheduling, in one or more mini-slots of a Physical Resource Block (PRB), a Hybrid Automatic Repeat Request (HARQ) transmission based at least in part on the fading condition; and transmitting, to the device, the HARQ transmission in the one or more mini-slots of the PRB.

AP: The system of paragraph AO, wherein detecting the fading condition of the device comprises detecting a slow-fading condition or a fast-fading condition.

AQ: The system of paragraph AP, wherein scheduling, in the one or more mini-slots of the PRB, the HARQ transmission based at least in part on the fading condition comprises: in response to detecting the slow-fading condition, scheduling the HARQ transmission in first and second mini-slots that are at a same time or in a same slot.

AR: The system of paragraph AP or AQ, wherein scheduling, in the one or more mini-slots of the PRB, the HARQ transmission based at least in part on the fading condition comprises: in response to detecting the fast-fading condition, scheduling the HARQ transmission in first and second mini-slots that are at different times and in different slots.

AS: The system of any of paragraphs AO-AR, wherein scheduling, in the one or more mini-slots of the PRB, the HARQ transmission based at least in part on the fading condition comprises: scheduling, in at least one symbol of the PRB, at least one HARQ feedback message; and scheduling, in the PRB, data bits.

AT: The system of paragraph AS, wherein the operations further comprise: in response to receiving the at least one HARQ feedback message in the PRB, determining that the at least one HARQ feedback message includes a non-acknowledgement (NACK); and in response to determining that the at least one HARQ feedback message includes the NACK, retransmitting, to the device, the HARQ transmission and the data bits.

AU: The system of paragraph AS or AT, wherein scheduling, in the at least one symbol of the PRB, the at least one HARQ feedback message comprises scheduling the at least one HARQ feedback message in at least one terminal symbol of a slot.

AV: The system of any of paragraphs AO-AU, wherein transmitting, to the device, the HARQ transmission in the one or more mini-slots of the PRB comprises transmitting the HARQ transmission in a Physical Downlink Control Channel (PDCCH).

AW: A method comprising: detecting a fading condition of a device; scheduling, in one or more mini-slots of a Physical Resource Block (PRB), a Hybrid Automatic Repeat Request (HARQ) transmission based at least in part on the fading condition; and transmitting, to the device, the HARQ transmission in the one or more mini-slots of the PRB.

AX: The method of paragraph AW, wherein detecting the fading condition of the device comprises detecting a slow-fading condition or a fast-fading condition.

AY: The method of paragraph AX, wherein scheduling, in the one or more mini-slots of the PRB, the HARQ transmission based at least in part on the fading condition comprises: in response to detecting the slow-fading condition, scheduling the HARQ transmission in first and second mini-slots that are at a same time or in a same slot.

AZ: The method of paragraph AX or AY, wherein scheduling, in the one or more mini-slots of the PRB, the HARQ transmission based at least in part on the fading condition comprises: in response to detecting the fast-fading condition, scheduling the HARQ transmission in first and second mini-slots that are at different times and in different slots.

BA: The method of any of paragraphs AW-AZ, wherein scheduling, in the one or more mini-slots of the PRB, the HARQ transmission based at least in part on the fading condition comprises: scheduling, in at least one symbol of the PRB, at least one HARQ feedback message; and scheduling, in the PRB, data bits.

BB: The method of paragraph BA, further comprising: receiving the at least one HARQ feedback message in the PRB; determining that the at least one HARQ feedback message includes a non-acknowledgement (NACK); and in response to determining that the at least one HARQ feedback message includes the NACK, retransmitting, to the device, the HARQ transmission and the data bits.

BC: The method of paragraph BA or BB, wherein scheduling, in the at least one symbol of the PRB, the at least one HARQ feedback message comprises scheduling the at least one HARQ feedback message in at least one terminal symbol of a slot.

BD: The method of any of paragraphs AW-BC, wherein transmitting, to the device, the HARQ transmission in the one or more mini-slots of the PRB comprises transmitting the HARQ transmission in a Physical Downlink Control Channel (PDCCH).

BE: A system comprising: one or more processors; a memory; and one or more components stored in the memory and executable by the one or more processors to perform operations comprising: detecting a fading condition of a device; scheduling, based at least in part on the fading condition, (i) a Hybrid Automatic Repeat Request (HARQ) transmission in first and second mini-slots of a Physical Resource Block (PRB), (ii) a HARQ feedback message in first and second symbols of the PRB, and (iii) Ultra Reliable Low Latency Communication (URLLC) data bits in multiple third symbols of the PRB; and transmitting, to the device, the HARQ transmission and the URLLC data bits in the PRB.

BF: The system of paragraph BE, wherein detecting the fading condition of the device comprises detecting a slow-fading condition, and wherein scheduling the HARQ transmission in the first and second mini-slots of the PRB comprises selecting the first and second mini-slots to be simultaneous or in a same frequency.

BG: The system of paragraph BE or BF, wherein detecting the fading condition of the device comprises detecting a fast-fading condition, and wherein scheduling the HARQ transmission in the first and second mini-slots of the PRB comprises selecting the first and second mini-slots to be at different times and in different frequencies.

BH: The system of any of paragraphs BE-BG, wherein the HARQ feedback message in the first symbol corresponds to the HARQ transmission in the first mini-slot, and the HARQ feedback message in the second symbol corresponds to the HARQ transmission in the second mini-slot.

While the example clauses described above are described with respect to one particular implementation, it should be understood that, in the context of this document, the content of the example clauses can also be implemented via a method, device, system, a computer-readable medium, and/or another implementation.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
one or more processors;
a memory; and
one or more components stored in the memory and executable by the one or more processors to perform operations comprising:
detecting a fast-fading condition of a device;
scheduling, based on the fast-fading condition:
a Hybrid Automatic Repeat Request (HARQ) transmission in first and second mini-slots of a Physical Resource Block (PRB) that are at different times and in different frequencies;
at least one HARQ feedback message in at least one first symbol of the PRB, the at least one first symbol being outside of the first and second mini-slots; and
data bits in at least one second symbol of the PRB; and causing one or more transceivers to transmit, to the device:
the HARQ transmission in the first and second mini-slots of the PRB; and
the data bits in the at least one second symbol of the PRB.

2. The system of claim 1, wherein the operations further comprise:
detecting a slow-fading condition of the device.

3. The system of claim 2, the HARQ transmission being a first HARQ transmission, the PRB being a first PRB, the different times being first and second times, the different frequencies being first and second frequencies, wherein the operations further comprise:
in response to detecting the slow-fading condition, scheduling a second HARQ transmission in third and fourth mini-slots of a second PRB that are at a same third time or in a same third frequency.

4. The system of claim 1, wherein the operations further comprise:
receiving, via the one or more transceivers, the at least one HARQ feedback message;
in response to receiving the at least one HARQ feedback message, determining that the at least one HARQ feedback message comprises a non-acknowledgement (NACK); and
in response to determining that the at least one HARQ feedback message comprises the NACK, causing the one or more transceivers to retransmit, to the device, the HARQ transmission and the data bits.

5. The system of claim 1, the different frequencies comprising a first frequency and a second frequency, wherein scheduling, in the at least one symbol of the PRB, the at least one HARQ feedback message comprises scheduling the at least one HARQ feedback message in at least one terminal symbol of a slot corresponding to a third frequency.

6. The system of claim 1, wherein causing the one or more transceivers to transmit, to the device, the HARQ transmission in the one or more mini-slots of the PRB comprises transmitting the HARQ transmission in a Physical Downlink Control Channel (PDCCH).

7. A method comprising:
detecting a fast-fading condition of a device;
scheduling, based on the fast-fading condition:
a Hybrid Automatic Repeat Request (HARQ) transmission in first and second mini-slots of a Physical Resource Block (PRB) that are at different times and in different frequencies;
at least one HARQ feedback message in at least one first symbol of the PRB, the at least one first symbol being outside of the first and second mini-slots; and
data bits in at least one second symbol of the PRB; and
transmitting, to the device:
the HARQ transmission in the first and second mini-slots of the PRB; and
the data bits in the at least one second symbol of the PRB.

8. The method of claim 7, further comprising:
detecting a slow-fading condition of the device.

9. The method of claim 8, the HARQ transmission being a first HARQ transmission, the PRB being a first PRB, the different times being first and second times, the different frequencies being first and second frequencies, the method further comprising:
in response to detecting the slow-fading condition, scheduling a second HARQ transmission in third and fourth mini-slots that are at a same third time or in a same third frequency.

10. The method of claim 7, further comprising:
receiving the at least one HARQ feedback message in the PRB;
determining that the at least one HARQ feedback message comprises a non-acknowledgement (NACK); and in response to determining that the at least one HARQ feedback message comprises the NACK, retransmitting, to the device, the HARQ transmission and the data bits.

11. The method of claim 7, the different frequencies comprising a first frequency and a second frequency, wherein scheduling, in the at least one symbol of the PRB, the at least one HARQ feedback message comprises scheduling the at least one HARQ feedback message in at least one terminal symbol of a slot corresponding to a third frequency.

12. The method of claim 7, wherein transmitting, to the device, the HARQ transmission in the first and second mini-slots of the PRB comprises transmitting the HARQ transmission in a Physical Downlink Control Channel (PDCCH).

13. A system comprising:
one or more transceivers;
one or more processors;
a memory; and
one or more components stored in the memory and executable by the one or more processors to perform operations comprising:
detecting a fast-fading condition of a device;
scheduling, based on the fast-fading condition, (i) a Hybrid Automatic Repeat Request (HARQ) transmission in first and second mini-slots of a Physical Resource Block (PRB) that are at different times and in different frequencies, (ii) a HARQ feedback message in first and second symbols of the PRB, and (iii) Ultra Reliable Low Latency Communication (URLLC) data bits in multiple third symbols of the PRB; and
causing the one or more transceivers to transmit, to the device, the HARQ transmission and the URLLC data bits in the PRB.

14. The system of claim 13, the HARQ transmission being a first HARQ transmission, the PRB being a first PRB, wherein the operations further comprise:
detecting a slow-fading condition of the device; and
scheduling a second HARQ transmission in third and fourth mini-slots of a second PRB that are simultaneous or in a same frequency.

15. The system of claim 13, wherein the HARQ feedback message in the first symbol corresponds to the HARQ transmission in the first mini-slot, and the HARQ feedback message in the second symbol corresponds to the HARQ transmission in the second mini-slot.

16. The system of claim 1, wherein detecting the fast-fading condition comprises:
identifying a Doppler shift of a wireless signal transmitted between the device and the system; and
determining that the Doppler shift is greater than a threshold.

17. The method of claim 7, wherein detecting the fast-fading condition comprises:
identifying a Doppler shift of a wireless signal transmitted between the device and a system; and
determining that the Doppler shift is greater than a threshold.

18. The system of claim 13, wherein detecting the fast-fading condition comprises:
identifying a Doppler shift of a wireless signal transmitted between the device and the system; and
determining that the Doppler shift is greater than a threshold.

19. The system of claim 1, wherein the at least one first symbol comprises two symbols of the PRB, and
wherein the data bits comprise Ultra Reliable Low Latency Communication (URLLC) data bits.

20. The method of claim 7, wherein the at least one first symbol comprises two symbols of the PRB, and
wherein the data bits comprise Ultra Reliable Low Latency Communication (URLLC) data bits.

* * * * *